(12) United States Patent
Funakoshi et al.

(10) Patent No.: US 7,593,047 B2
(45) Date of Patent: Sep. 22, 2009

(54) CMOS IMAGE SENSOR FOR SUPPRESSING DEGRADATION OF SPATIAL RESOLUTION AND GENERATING COMPRESSED IMAGE SIGNALS

(75) Inventors: Jun Funakoshi, Kawasaki (JP); Katsuyoshi Yamamoto, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 995 days.

(21) Appl. No.: 09/962,236

(22) Filed: Sep. 26, 2001

(65) Prior Publication Data

US 2002/0154347 A1    Oct. 24, 2002

(30) Foreign Application Priority Data

Apr. 19, 2001    (JP) .............................. 2001-121727

(51) Int. Cl.
*H04N 9/04*     (2006.01)
*H04N 5/335*    (2006.01)
*H04N 9/083*    (2006.01)
*H04N 3/14*     (2006.01)

(52) U.S. Cl. ................... 348/273; 348/302; 348/280

(58) Field of Classification Search .............. 348/308, 348/281, 248, 280, 320, 294, 319, 321, 322, 348/323, 324, 304, 300, 302, 303, 272, 277, 348/230.1, 348, 273, 266, 269; 382/167
See application file for complete search history.

(56) References Cited

U.S. PATENT DOCUMENTS

| 4,471,228 | A | * | 9/1984  | Nishizawa et al. ......... 348/298 |
| 5,262,871 | A | * | 11/1993 | Wilder et al. ............. 348/307 |
| 5,493,335 | A | * | 2/1996  | Parulski et al. ........... 348/231.6 |
| 5,841,471 | A | * | 11/1998 | Endsley et al. ............ 348/231.6 |
| 5,949,483 | A | * | 9/1999  | Fossum et al. ............. 348/303 |
| 5,965,871 | A | * | 10/1999 | Zhou et al. ............... 250/208.1 |
| 6,118,481 | A | * | 9/2000  | Hamada .................. 348/220.1 |
| 6,124,819 | A | * | 9/2000  | Zhou et al. ............... 341/155 |
| 6,369,853 | B1 | * | 4/2002  | Merrill et al. ............. 348/302 |
| 6,441,849 | B1 | * | 8/2002  | Fukuda .................... 348/230.1 |
| 6,452,153 | B1 | * | 9/2002  | Lauxtermann et al. ...... 250/208.1 |
| 6,501,483 | B1 | * | 12/2002 | Wong et al. ............... 345/611 |

(Continued)

FOREIGN PATENT DOCUMENTS

EP    0 720 388 A2    7/1996

(Continued)

OTHER PUBLICATIONS

Kemeny, S.E.; Panicacci, R.; Pain, B.; Matthies, L.; Fossum, E.R.; "Multiresolution image sensor", IEEE Transactions on Circuits and Systems for Video Technology, vol. 7, Issue 4, Aug. 1997 pp. 575-583.*

*Primary Examiner*—Lin Ye
*Assistant Examiner*—Nelson D Hernández Hernández
(74) *Attorney, Agent, or Firm*—Arent Fox LLP

(57) ABSTRACT

The present invention is an image sensor having a pixel array, which arranges pixels having photoelectric conversion circuits in rows and columns; and a pixel selecting circuit for selecting each pixel, wherein the pixel selecting circuit selects pixels of all rows and/or pixels of all columns, and selects a pixel signal at every plural pixels among the selected pixel signals, and pixels selected from a pixel block of a plurality of rows and columns within the pixel array are dispersed within this pixel block.

9 Claims, 17 Drawing Sheets

U.S. PATENT DOCUMENTS

| | | | |
|---|---|---|---|
| 6,512,858 B2 * | 1/2003 | Lyon et al. | 382/305 |
| 6,646,680 B1 * | 11/2003 | Mead et al. | 348/230.1 |
| 6,661,451 B1 * | 12/2003 | Kijima et al. | 348/220.1 |
| 6,833,869 B1 * | 12/2004 | Okamoto | 348/294 |
| 6,888,568 B1 * | 5/2005 | Neter | 348/222.1 |
| 6,972,791 B1 | 12/2005 | Yomeyama | |
| 2001/0030700 A1 * | 10/2001 | Mabuchi et al. | 348/302 |
| 2001/0043276 A1 * | 11/2001 | Ueno | 348/322 |
| 2002/0106129 A1 * | 8/2002 | Yadid-Pecht | 382/232 |
| 2002/0186312 A1 * | 12/2002 | Stark | 348/302 |

FOREIGN PATENT DOCUMENTS

| | | |
|---|---|---|
| JP | 08-182005 | 7/1996 |
| JP | 09-168157 | 6/1997 |
| JP | 09-294228 | 11/1997 |
| JP | 11-146278 | 5/1999 |
| JP | 11-164204 A | 6/1999 |
| JP | 2000-4406 A | 1/2000 |
| JP | 2000-134550 | 5/2000 |
| JP | 2001-036920 | 2/2001 |
| WO | WO 9001844 A1 * | 2/1990 |

* cited by examiner

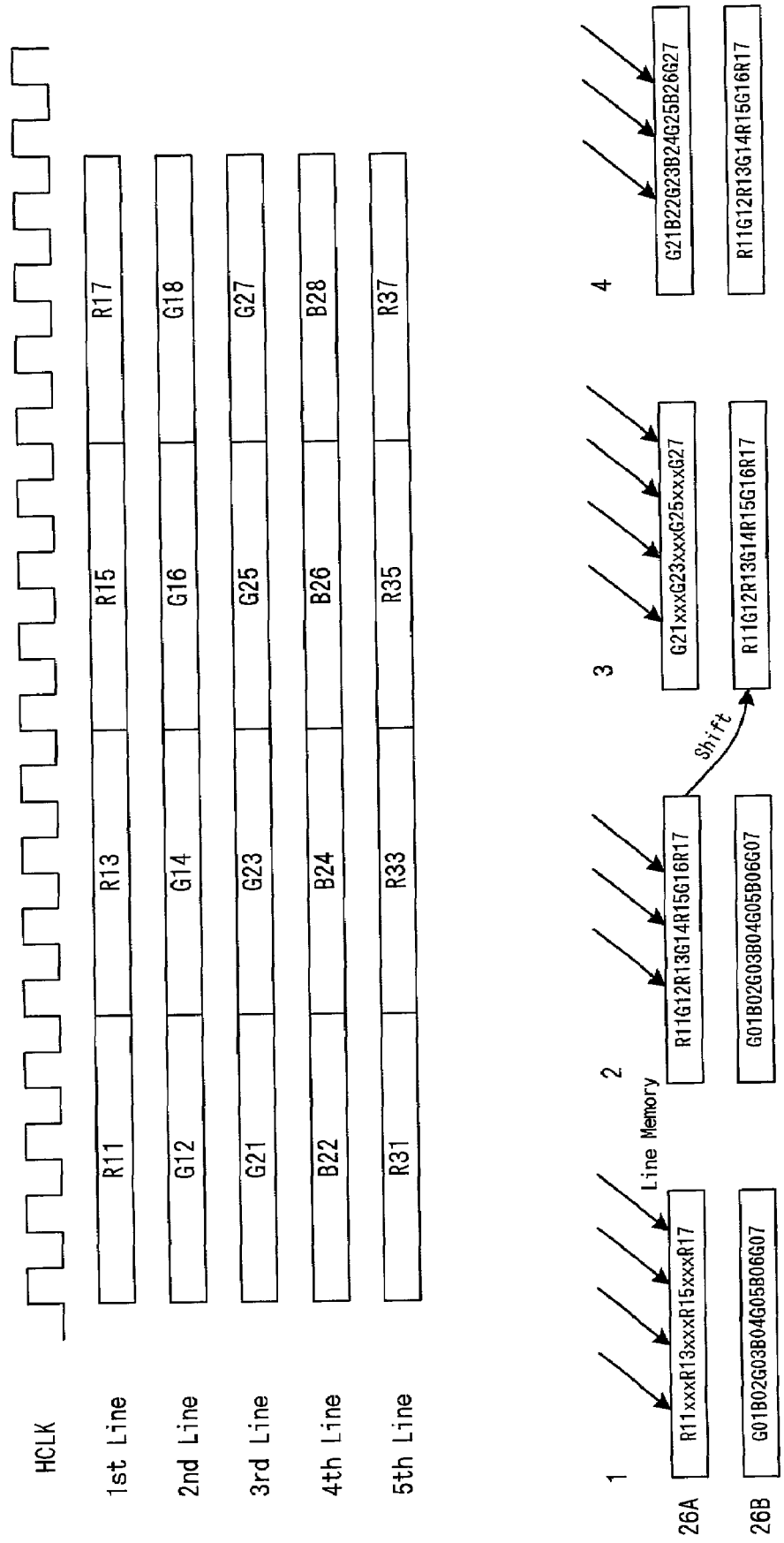

CMOS IMAGE SENSOR FOR SUPPRESSING DEGRADATION OF SPATIAL RESOLUTION AND GENERATING COMPRESSED IMAGE SIGNALS

BACKGROUND OF THE INVENTION

1. Field of the Invention

The present invention relates to a CMOS (complementary metal-oxide semiconductor) image sensor, and more particularly to a CMOS image sensor capable of preventing the degradation of spatial resolution when decreasing pixels for a color image, and generating a compressed image signal.

2. Description of the Related Art

A CCD (charge-coupled device) sensor is used as an image sensor in digital still cameras and video tape recorders. A CCD sensor differs from an ordinary CMOS structure, and in line with this, requires a fabrication process line with a degree of cleanness that is higher than the degree of cleanness for an ordinary CMOS LSI. Fabrication process line requirements such as this adversely affect the lowering of CCD sensor prices.

Meanwhile, attention is focusing on inexpensive versions of CMOS image sensors in place of CCD sensors. A CMOS image sensor can be fabricated via an ordinary CMOS fabrication process, since the CMOS image sensor constitutes a pixel using a photoelectric conversion circuit, which uses an MOS (metal-oxide semiconductor) transistor and a photodiode. As a result of this, a CMOS image sensor can be fabricated by a semiconductor fabrication line of an ordinary degree of cleanness, and, in addition, an image signal detecting circuit, and an image processing circuit comprising color processing can be formed on the same chip as an array of pixels, enabling a significant cost reduction compared to a CCD sensor. At present, the use of a CMOS image sensor as the image sensor of an inexpensive digital still camera has been proposed.

In a CMOS image sensor, RGB (red, green, blue) color filters are disposed on top of chip pixels, and pixels corresponding to each of these colors output detection signals (pixel signals) corresponding to the respective RGB gray scale values. Moreover, it is known that outputting more numerous detection signals of green (G), to which the human eye is most responsive, makes people highly sensitive, and an ordinary pixel array is a Bayer Space, which constitutes odd rows, which alternate red (R) and green (G), and even rows, which alternate blue (B) and green (G). In this array, green (G), which is the color for a luminance signal requiring high resolution, is arranged in a checkered pattern, and red (R) and green (G), which are the remaining color, are arranged in a checkered pattern therebetween.

As a result of this, a detection signal outputted from a pixel array is an RGB mosaic signal in the order of RGRG . . . GBGB . . . . This RGB mosaic signal is converted to an RGB gray scale signal (RGB simultaneous signal) for each pixel, and after a predetermined image processing, an image signal comprising an RGB gray scale signal corresponding to each pixel is outputted.

In an image sensor such as this, when a compressed image signal is outputted, the decreasing of a pixel signal is performed at a constant ratio. For example, when an image is displayed on a relatively small LCD (liquid crystal display) display panel provided on a digital still camera or the like, because the number of pixels of the LCD display panel are less than the number of pixels of the image sensor, decreasing processing (sub-sampling processing) becomes necessary.

A method carried out for a CCD sensor is decreasing processing, wherein fixed pixel data is decreased after the A/D conversion of a pixel signal outputted from a pixel array, and such a method is being pursued for a CMOS image sensor as well. Or, as another method, decreasing processing is also possible by simply decreasing an image signal after generating an RGB simultaneous signal and performing color processing.

FIG. 1 is a diagram illustrating conventional decreasing for an RGB mosaic signal. In the pixel array 10, RGRG . . . pixels are arranged in the odd numbered rows, and GBGB . . . pixels are arranged in the even numbered rows. The pixel signals of each row are outputted to a column line CL by driving a row selecting line ROW according to a vertical scanning circuit 12. The pixel signals outputted to a column line CL are held by a sample-and-hold circuit SH provided for each column, and are outputted from an output line 16 via column gates CG. Column gates CG are sequentially selected by column selection signals CS1-CS8 from a column selecting circuit 14, and pixel signals, which the sample-and-hold circuits SH of the respective columns are holding, are sequentially outputted.

Thus, pixel signals outputted from output line 16 are in the order of RGRG . . . GBGB . . . , and by decreasing every two pixels from these pixel signals, one-fourth of all the pixel signals are decreased. The pixels enmeshed inside pixel array 10 of FIG. 1 are pixels corresponding to pixel signals, which are read out by decreasing processing.

However, the above-mentioned decreasing processing method requires that hardware for decreasing processing be added to the stage subsequent to an A/D converter. The addition of such hardware adversely affects CMOS image sensor cost-cutting.

Further, for the former decreasing processing, as shown in FIG. 1, an RGB mosaic signal is decreased at four pixels of two rows and two columns from among 16 pixels of four rows and four columns, and moreover, four pixels adjacent to a corner within the 16 pixels are outputted. A four-pixel RGB simultaneous signal is generated from the output RGGB pixel signals for these four pixels. As a result of this, the spatial resolution of a pixel signal subjected to decreasing processing deteriorates.

SUMMARY OF THE INVENTION

Accordingly, an object of the present invention is to provide a CMOS image sensor capable of performing decreasing processing of pixel signals without increasing in hardware.

Further, another object of the present invention is to provide a CMOS image sensor capable of performing decreasing processing of pixel signals while suppressing the degradation of spatial resolution.

To achieve the above-mentioned objects, a first aspect of the present invention is an image sensor having a pixel array, which arranges pixels, having photoelectric conversion circuits, in rows and columns; and a pixel selecting circuit for selecting each pixel, wherein the pixel selecting circuit selects pixels of all rows and/or pixels of all columns, and selects a pixel signal at every plural pixels among the selected pixel signals, and pixels selected from a pixel block of a plurality of rows and columns within the pixel array are dispersed within this pixel block.

According to the above invention, a pixel selecting circuit, which selects pixels of a pixel array, disperses selected pixels inside a pixel block of a plurality of rows and columns, which is the smallest unit of decreasing processing, therefore, it is possible to suppress the degradation of spatial resolution. That is, the pixel selecting circuit selects pixels such that the selected pixels are dispersed inside a pixel block, which is the smallest unit of decreasing processing. Furthermore, since a pixel signal, which has already been decreased, is subjected to AD conversion, and outputted to an RGB simultaneous signal generating circuit or color processing circuit, it is possible to reduce the hardware circuits for decreasing processing.

To achieve the above-mentioned objects, a second aspect of the present invention is an image sensor having a pixel array, which arranges pixels, having photoelectric conversion circuits, in rows and columns; a row selecting circuit for selecting pixels in the row direction of the pixel array; sample-and-hold circuits for holding pixel signals outputted from the pixel array; and a column selecting circuit for selecting pixel signals being held by these sample-and-hold circuits, wherein the sample-and-hold circuits average pixel signals of the same color, which are close to one another in the row direction and/or column direction of the pixel array.

According to the above invention, the average to pixel signals being held by the sample-and-hold circuits is taken between same color pixels being close each other, and these averaged pixel signals are outputted. Therefore, although an outputted pixel signal has a resolution, which has been decreased at a constant ratio, the original pixel signal for generating this pixel signal has higher spatial resolution.

BRIEF DESCRIPTION OF THE DRAWINGS

FIG. 6 is a diagram showing pixel signals outputted to output line 16, and line memory operation relative thereto in the first aspect of the embodiment;

DESCRIPTION OF THE PREFERRED EMBODIMENTS

The embodiment of the present invention will be explained hereinbelow by referring to the figures. However, the scope of protection of the present invention is not limited to the aspects of the embodiment hereinbelow, but rather extends to the inventions disclosed in the claims, and to the equivalents thereof.

Figure 2:
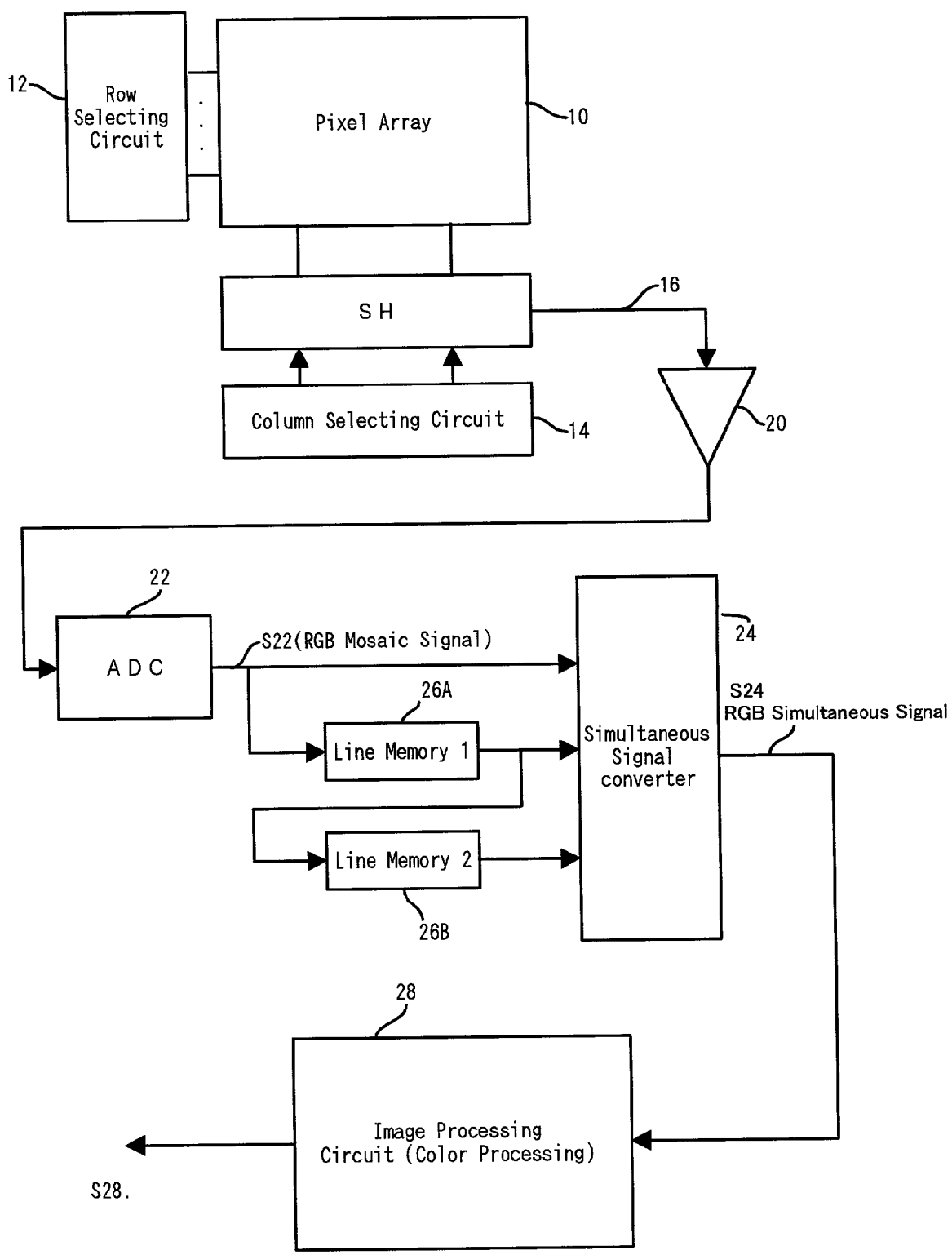
FIG. 2 is a block diagram of an entire CMOS image sensor in an aspect of the embodiment.

FIG. 2 is a block diagram of an entire CMOS image sensor in an embodiment. The image sensor shown in the figure has a pixel array 10, in which pixels, each having a photoelectric conversion circuit, are arranged in rows and columns; a row selecting circuit 12 for selecting pixels in the row direction; sample-and-hold circuits SH for holding pixel signals outputted to a column line from a selected pixel; and a column selecting circuit 14 for selecting pixel signals being held in sample-and-hold circuits SH, and outputting same to an output line 16.

An analog pixel signal is outputted to output line 16, amplified by an amplifier 20, and converted to a digital pixel signal (pixel data) by an analog-to-digital converter 22. As will be explained hereinbelow, a pixel array 10 is constituted such that pixel signals of RGRG . . . are detected in the odd numbered rows, and pixel signals of GBGB . . . are detected in the even numbered rows. Therefore, the output signal S22 of AD converter 22 is an RGB mosaic signal.

An output image signal S28 outputted from the image sensor must have RGB gray scale data for each pixel. Thus, RGB mosaic signal S22 is converted to an RGB simultaneous signal S24 (a signal having RGB gray scale data for each pixel) by a simultaneous signal converter 24. An RGB simultaneous signal S24 is determined from the RGB mosaic signals of pixels surrounding the pixel targeted for determination. Thus, in the example of FIG. 2, mosaic signals for three rows are supplied to the simultaneous signal converter 24. Therefore, line memories 26A, 26B for storing one row's worth of mosaic signals S22 are provided. Two rows' worth of mosaic signals are supplied from these two line memories 26A, 26B, and the mosaic signal S22 of the final third row is supplied from AD converter 22.

A thus determined RGB simultaneous signal S24 for each pixel is subjected to color processing, such as color adjustment, edge enhancement processing, and gamma correction, by a subsequent-stage image processing circuit 28, and outputted as an output image signal S28.

Figure 3:
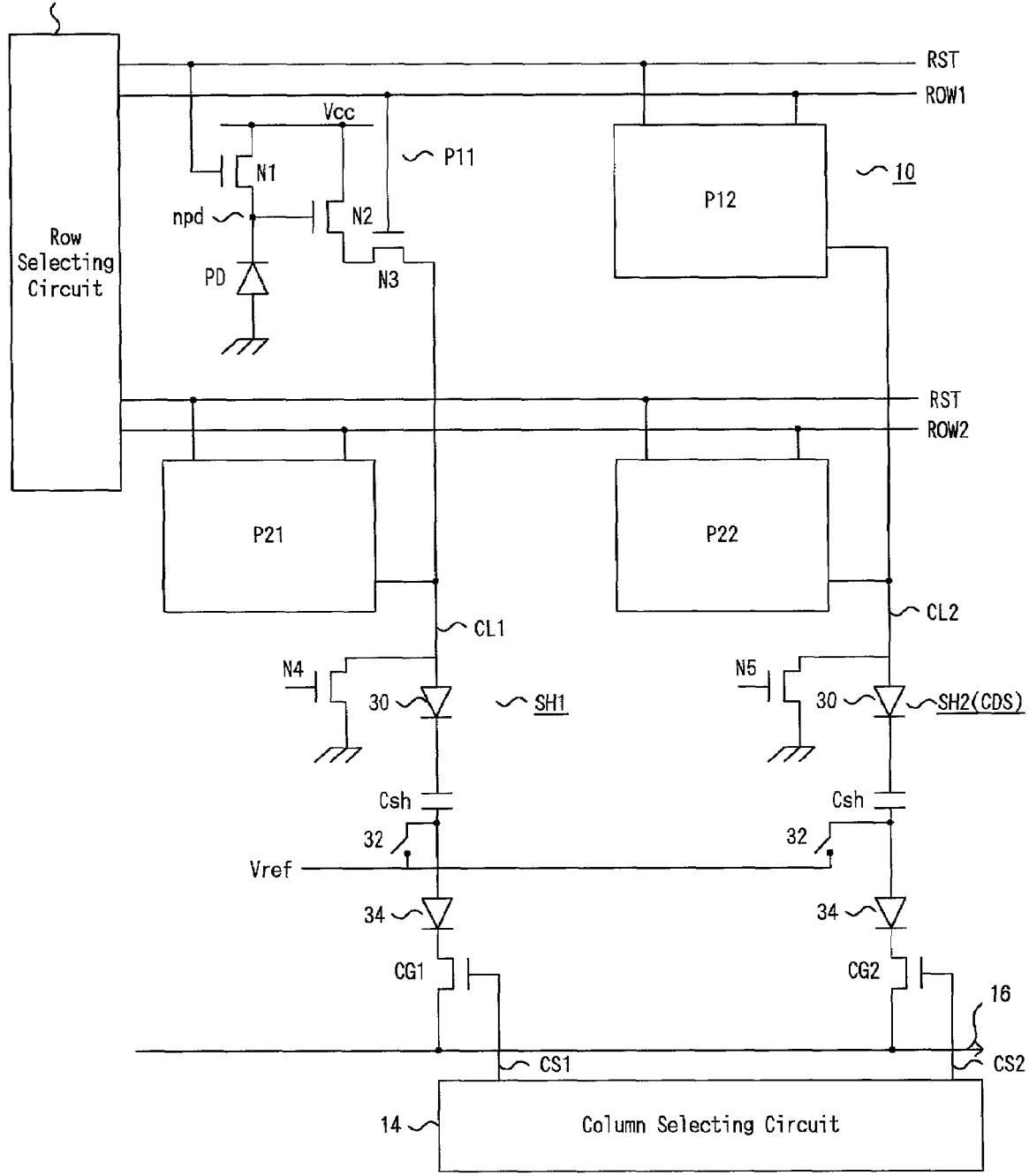
FIG. 3 is a diagram showing a photoelectric conversion circuit inside a pixel, and a sample-and-hold circuit for each column.

FIG. 3 is a diagram showing a photoelectric conversion circuit inside a pixel, and a sample-and-hold circuit for each column. In the figure, the pixels P11-P22 of two rows and two columns are shown, and a photoelectric conversion circuit inside a pixel is shown only for pixel P11.

In the photoelectric conversion circuit inside the pixel, a reset transistor N1, an amplifier transistor N2, and a selection transistor N3 are provided relative to a photodiode PD, which is a photoelectric converting device. By the row selecting circuit 12 driving a reset line RST, the reset transistor N1 becomes conductive, and a connecting node npd with the photodiode PD is pre-charged to the power source Vcc level. When the reset transistor N1 becomes nonconductive, a current corresponding to an amount of light being received is generated by the photodiode PD, and the electric potential of the node npd is reduced by this current. Then, after a fixed light receiving period, when the row selecting circuit 12 drives a row line ROW1, causing the selection transistor N3 to become conductive, a signal of electric potential amplified by transistor N2 is outputted to a column line CL1. A source of current transistor N4 is connected to column line CL1.

Next, sample-and-hold circuits SH1, SH2 connected to each column line CL1, CL2 will be explained. Sample-and-hold circuits SH1, SH2 shown in the figure are examples of CDS (Correlated Double Sampling) circuits. A CDS circuit has a capacitor Csh for holding an analog image signal outputted to a column line CL1, CL2. And analog amplifiers 30, 34 are disposed before and after the capacitor Csh, respectively.

Furthermore, to remove undesired noise, a capacitor Csh holds a voltage differential of a reset level and a detection level. Thus, when the photoelectric conversion circuit of a pixel is reset, the reset level is held in the capacitor Csh. At that time, a reference voltage Vref is applied to an electrode on the opposite side of the capacitor Csh via a reset switch 32. As a result of this, a voltage of Vref−Vr (Vr being the reset level) is held in the capacitor Csh.

Next, a received-light signal Vn, which the electric potential reduces in accordance with the amount of received light, is applied to a capacitor Csh after the light-receiving period. Reset switch 32 is in the open state at this time, and consequently, Vref−Vr+Vn=Vref−(Vr−Vn) is applied to the capacitor Csh. Undesired noise is removed by this (Vr−Vn), and a pixel signal corresponding to the amount of received light is outputted by amplifier 34.

Pixel signals, which sample-and-hold circuits SH1, SH2 cause to be held by capacitors Csh, are outputted to output line 16 via column gates CG1, CG2. Thus, column selecting circuit 14 drives column selection signals CS1, CS2 in succession, and causes column gates CG1, CG2 to conduct in sequence. As a result of this, pixel signals detected for pixels of the same row are outputted from output line 16 in time sequence.

Figure 1:
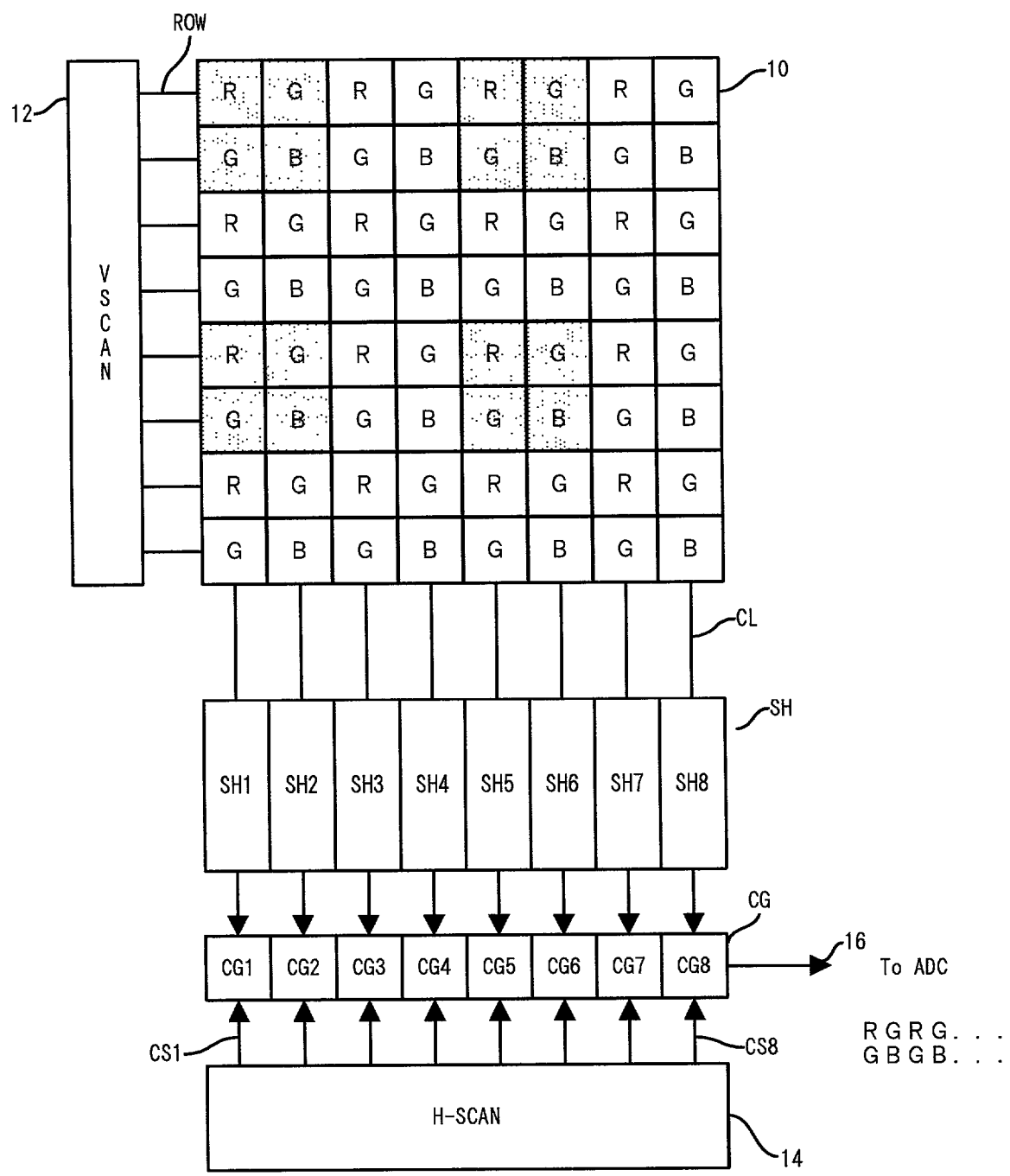
FIG. 1 is a diagram illustrating decreasing processing for a conventional RGB mosaic signal.
Figure 4:
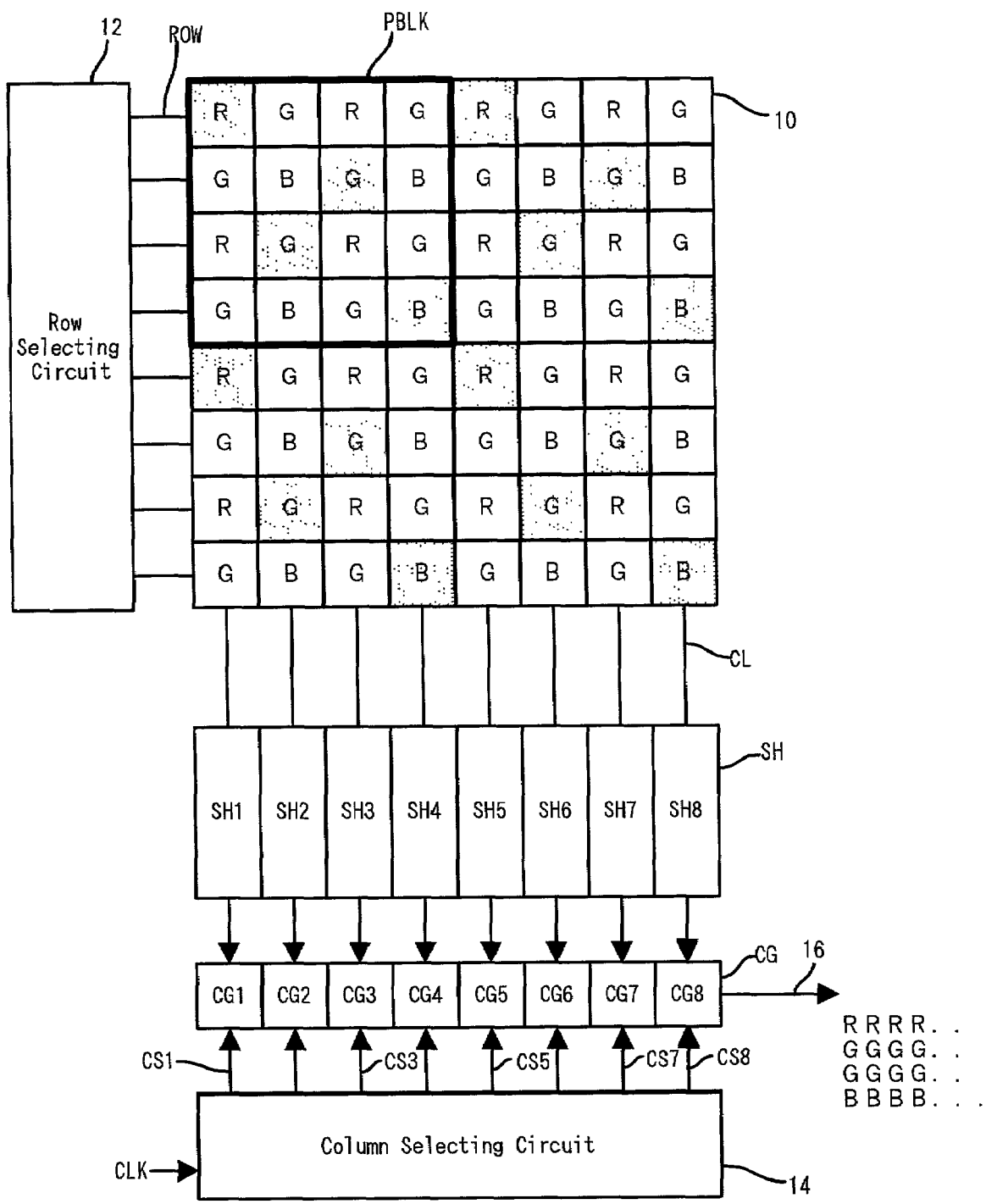
FIG. 4 is a diagram showing selected pixels in a first aspect of the embodiment.

FIG. 4 is a diagram showing selected pixels in a first aspect of the embodiment. FIG. 4 shows enmeshed pixels selected as a result of quarter decreasing processing. In a pixel, which generates an RGB mosaic signal, for quarter decreasing, it is necessary to select one red (R) pixel, two green (G) pixels and one blue (B) pixel from a pixel block PBLK comprising 16 pixels of four rows and four columns, which is the smallest unit of decreasing processing. Accordingly, in this aspect of the embodiment, the first R pixel in the first row, the third G pixel in the second row, the second G pixel in the third row, and the fourth B pixel in the fourth row are selected in the pixel block PBLK. These four selected pixel signals constitute an RGGB mosaic signal. However, the four selected pixels are dispersed inside the pixel block PBLK. Thus, the spatial resolution of the outputted RGB mosaic signal is higher than the conventional example of FIG. 1.

As described hereinabove, in order to select four pixels of dispersed locations inside a pixel block PBLK, which is the smallest unit of decreasing processing, column selecting circuit 14 generates column selection signals CS1-CS8 differently from an ordinary operation when decreasing processing is not performed. That is, when row selecting circuit 12 selects pixels of the first row, from among the sample-and-hold circuit-held pixel signals, only the first column and fifth column are selected from column gates CG1, CG5, and are outputted sequentially to output line 16. Thus, column selecting circuit 14 sequentially drives column selection signals CS1, CS5. As a result of this, the pixel signals of the first row all constitute R pixel signals.

Figure 5A:
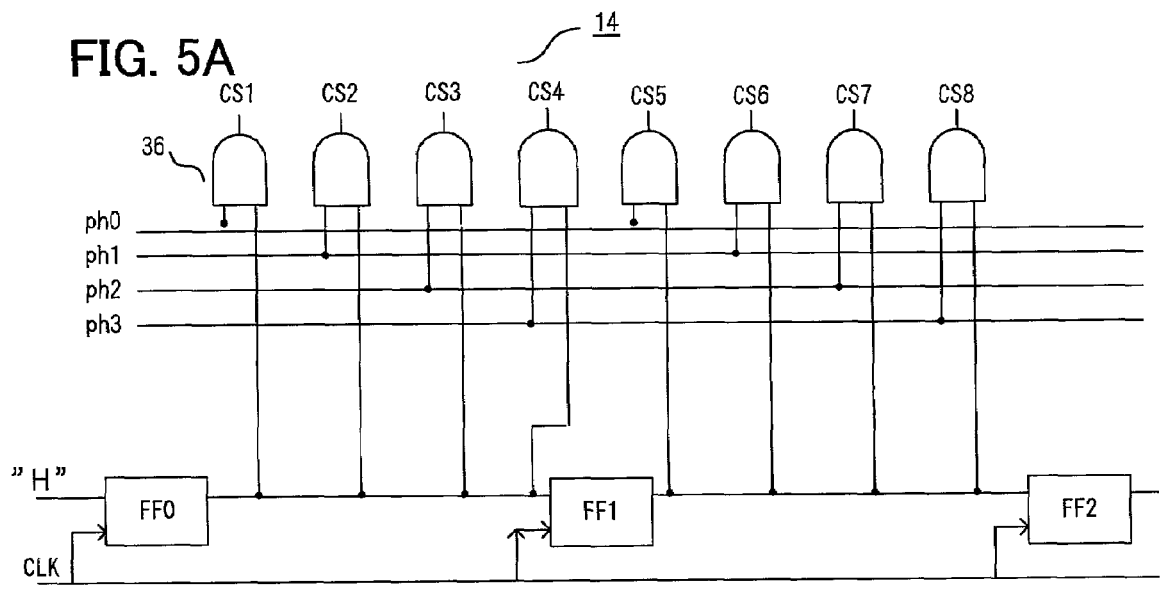
FIG. 5 is a diagram showing an example of a column selecting circuit and the operation thereof.
Figure 5B:
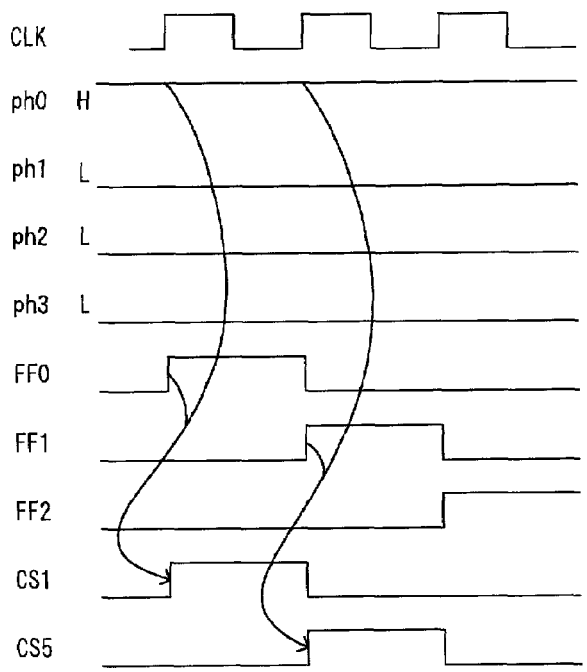

FIG. 5 is a diagram showing an example of a column selecting circuit and the operation thereof. Column selecting circuit 14 comprises a shift register comprising flip-flops FF0, 1, 2 for transmitting an H level in accordance with a clock CLK, and an OR gate group 36, which drives column selection signals CS1-CS8 by OR operations of flip-flop outputs and phase signals ph0-ph3. According to an operation in the first phase period shown in FIG. 5B, only phase signal ph0 is driven to H level, and the remaining phase signals ph1-ph3 constitute L level. In this state, by the shift register shifting to H level in synchronization with clock CLK, column selection signals CS1, CS5 are driven in sequence.

Returning to FIG. 4, when row selecting circuit 12 selects pixels of the second row, only the third column and the seventh column are selected from column gates CG3, CG7, and G pixel signals are outputted to output line 16 in sequence. In the column selecting circuit 14 of FIG. 5, only phase signal ph2 transitions to H level, and the shift register shifts to H level in synchronization with clock CLK. As a result of this, column selection signals CS3, CS7 are driven in sequence.

When row selecting circuit 12 selects pixels of the third row, only the second column and the sixth column are selected, and G pixel signals are outputted to output line 16 in sequence. Furthermore, when row selecting circuit 12 selects pixels of the fourth row, only the fourth column and the eighth column are selected, and B pixel signals are outputted to output line 16 in sequence.

In this manner, according to the operations of row selecting circuit 12 and column selecting circuit 14 in line with decreasing processing, row selecting circuit 12 drives the row lines ROW sequentially, and selects pixels of each row in order, and column selecting circuit 14 drives column selection signals CG1-CG4 such that all of the columns inside a pixel block PBLK are selected, and one R pixel, two G pixels and one B pixel are selected. As a result of this, the signals of four pixels dispersed inside a pixel block PBLK are selected and outputted.

FIG. 6 is a diagram showing pixel signals outputted to output line 16, and line memory operation relative thereto in the first aspect of the embodiment. As described hereinabove, red (R) pixel signals R11, R13, R15, R17 are outputted from the first row of pixels every four cycles of a horizontal clock HCLK. The numbers of these pixel signals indicate the sequence of the pixels ultimately decreased and read out. In line with the readout thereof, readout pixel signals R11, R13, R15, R17 are written to an odd-numbered address of line memory 26A, which is provided in the stage prior to simultaneous signal converter 24.

Next, green (G) pixel signals G12, G14, G16, G18 are outputted from the second row of pixels, and written to an even-numbered address of line memory 26A. Pixel signals of line memory 26A are shifted to another line memory 26B, and green (G) pixel signals G21, G23, G25, G27, which were outputted from the third row of pixels, are written to an odd-numbered address of line memory 26A. Furthermore, blue (B) pixel signals B22, B24, B26, B28 outputted from the fourth row of pixels are written to an even-numbered address of line memory 26A.

As described hereinabove, an RGRGRG mosaic signal is written to line memory 26B, and a GBGBGB mosaic signal is written to line memory 26A, respectively.

Figure 7:
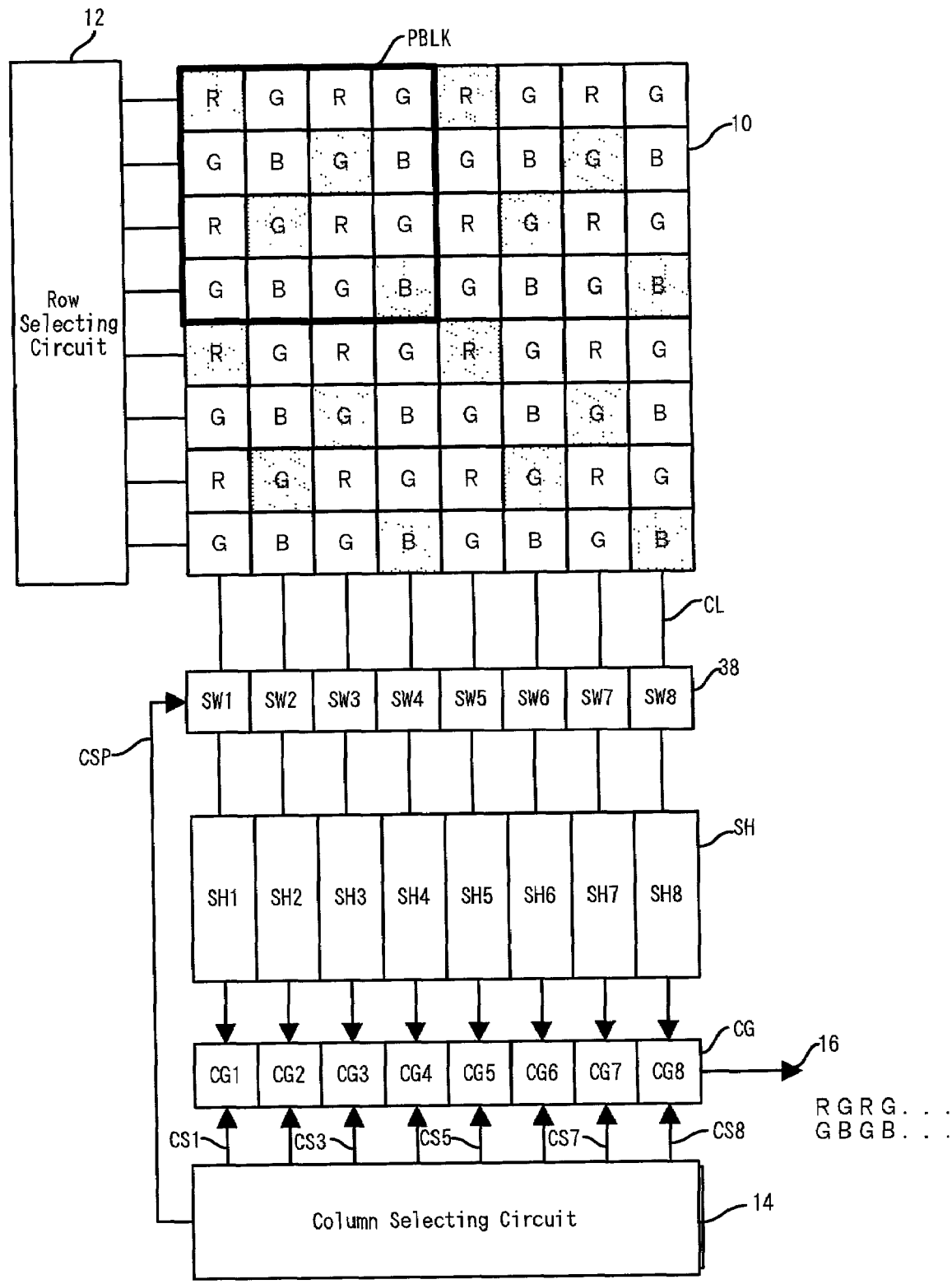
FIG. 7 is a block diagram of an image sensor showing an example of a variation of the first aspect of the embodiment.

FIG. 7 is a block diagram of an image sensor, showing a variation of the first aspect of the embodiment. FIG. 7 differs from FIG. 4 in that a group of switches 38 for column selection are disposed between the pixel array 10 and the sample-and-hold circuits SH. This group of column selection switches 38 is controlled by pre-stage column selection signals CSP from column selecting circuit 14.

According to this variation, when a pixel array of the first row is selected, only R pixel signals of the first columns inside pixel block PBLKs are held in sample-and-hold circuits SH1, SH5 via column selection switches SW1, SW5. Next, when the pixel array of the second row is selected, only G pixel signals of the third columns inside pixel block PBLKs are held in sample-and-hold circuits SH3, SH7 via column selection switches SW3, SW7. Thereafter, RGRGRG mosaic signals held in sample-and-hold circuits SH are sequentially outputted to output line 16 via column gates CG1, CG3, CG5, CG7 by column selection signals CS1, CS3, CS5, CS7 from column selecting circuit 14.

Similarly, when the pixel array of the third row is selected, only G pixel signals of the second columns inside pixel blocks PBLK are held in sample-and-hold circuits SH, and when the pixel array of the subsequent fourth row is selected, B pixel signals of the fourth columns inside pixel blocks PBLK are held. And thereafter, GBGBGB mosaic signals are sequentially outputted to output line 16 from even-numbered column gates CG.

According to the above variation, R pixel signals of the first row of pixel array are held one time by sample-and-hold circuits SH, and G pixel signals of the pixel array of the subsequent second row are held by sample-and-hold circuits SH, and thereafter, these RGRGRG pixel signals are outputted to output line 16. Consequently, the pixel signals outputted to this output line 16 are the same as RGRGRG mosaic signals of an ordinary readout. Therefore, it is possible for a subsequent stage circuit to generate an RGB simultaneous signal by the same operation as an ordinary readout.

In the first aspect of the embodiment, according to another method for selecting pixels inside a pixel block PBLK, a G pixel of the fourth column is selected in the first row, a B pixel of the second column is selected in the second row, an R pixel of the third column is selected in the third row, and a G pixel of the first column is selected in the fourth row. Or, in another pixel selection method, an R pixel of the third column is selected in the first row, a G pixel of the first column is selected in the second row, a G pixel of the fourth column is selected in the third row, and a B pixel of the second column is selected in the fourth row. Furthermore, in another pixel selection method, a G pixel of the second column is selected in the first row, a B pixel of the fourth column is selected in the second row, an R pixel of the first column is selected in the third row, and a G pixel of the third column is selected in the fourth row. By performing the above selections, all of the rows and columns inside a pixel block can be selected, and the pixel signals, which are read out, can be dispersed inside the pixel block.

Figure 8:
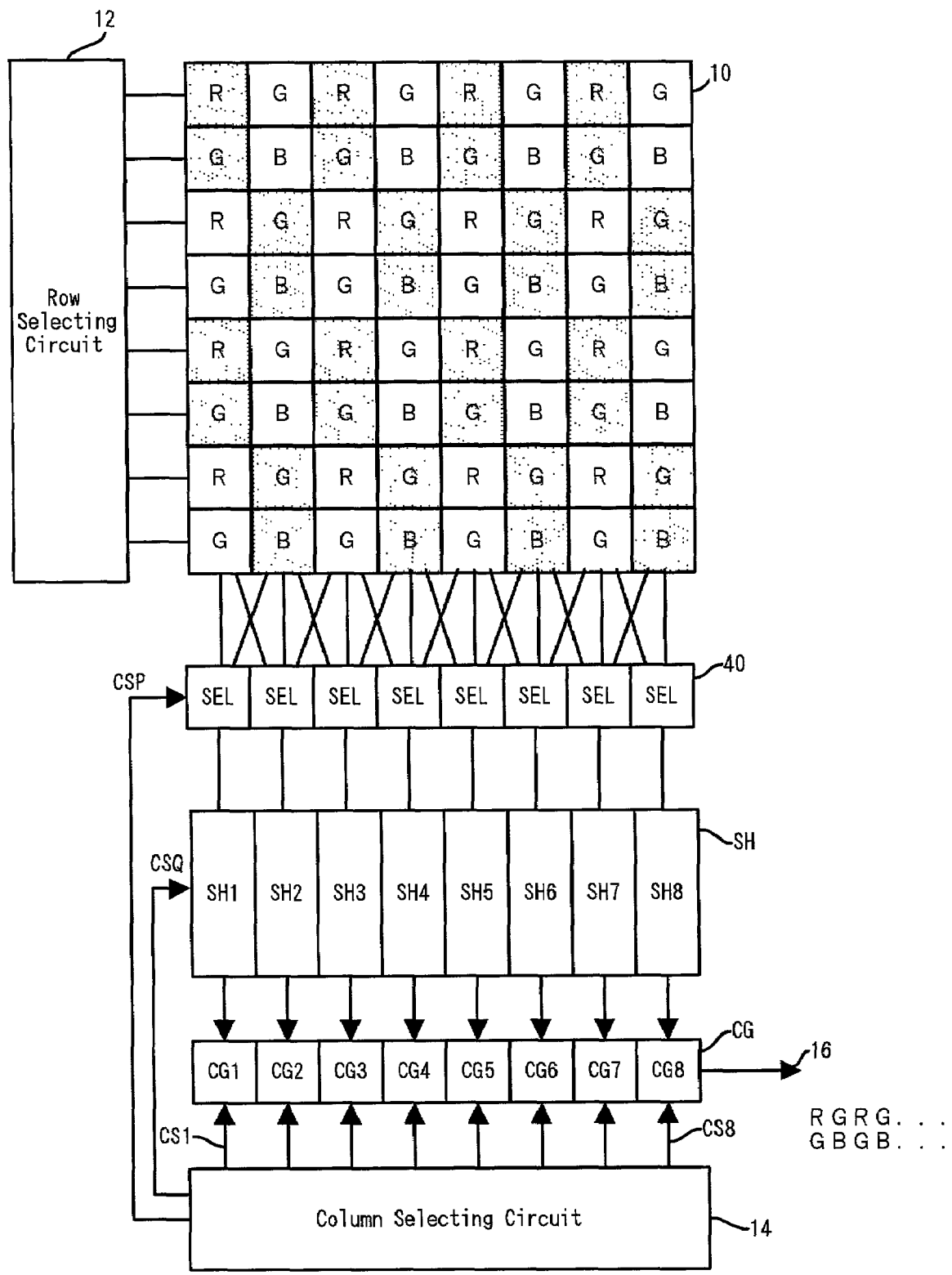
FIG. 8 is a block diagram of an image sensor of a second aspect of the embodiment.

FIG. 8 is a block diagram of an image sensor in a second aspect of the embodiment. In the second aspect of the embodiment, in order to decrease the pixel signals to a quarter of all, pixel signals decreased to a half are read out from pixel array 10, the averages of pixel signals of the same color, which are close to one another in the row direction, are taken, and in the end, one-fourth of the decreased pixel signals are outputted. Thus, the image sensor of FIG. 8 differs from that of FIG. 4 in that one-third selectors 40 are disposed between pixel array 10 and sample-and-hold circuits SH, and furthermore, as will be explained hereinbelow, switches for generating averages are disposed between adjacent columns inside sample-and-hold circuits SH. The one-third selectors 40 are controlled by control signals CSP, and average switches inside sample-and-hold circuits SH are controlled by control signals CSQ.

In the pixel selection method in the second aspect of the embodiment, as shown in FIG. 8, all the R pixel signals in the pixel array of the first row are read out, averaging is performed between adjacent R pixels in the sample-and-hold circuits SH, and the one-fourth decreased R pixel signals are outputted. Further, all the G pixel signals in the pixel array of the second row are read out, averaging is performed in the same way by the sample-and-hold circuits SH, and the one-fourth decreased G pixel signals are outputted. At this point in time, the RGRG pixel signals being held in the sample-and-hold circuits are outputted to output line 16 from column gates. Similarly, all G pixel signals in the pixel array of the third row are read out, and averaging is performed between adjacent pixels, and all B pixel signals in the pixel array of the fourth row are readout, and averaging is performed between adjacent pixels. Thereafter, the GBGB pixel signals being held in the sample-and-hold circuits are outputted to output line 16 from column gates.

Figure 9:
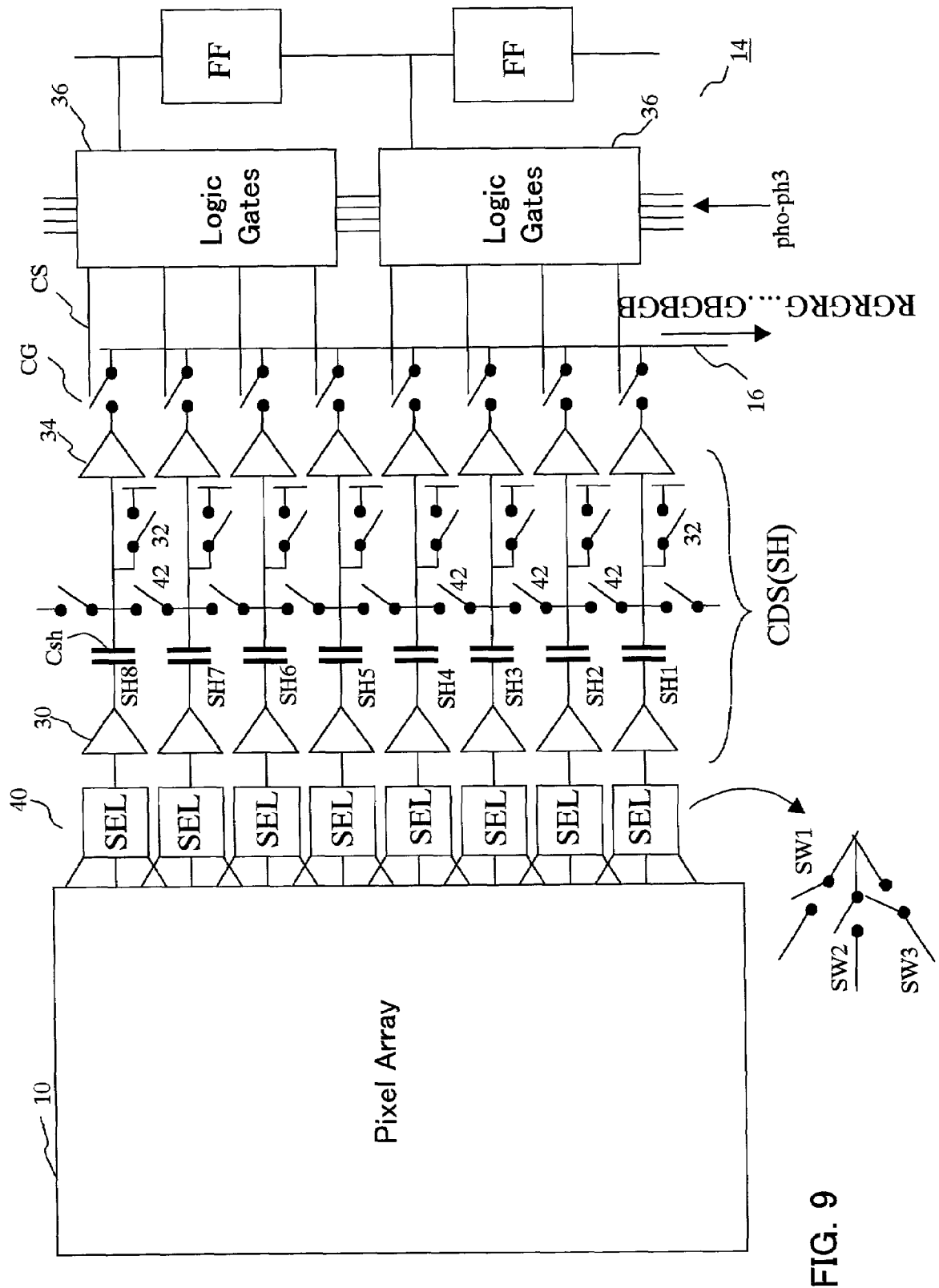
FIG. 9 is a diagram showing a detailed circuit diagram of sample-and-hold circuits in the second aspect of the embodiment.

FIG. 9 is a diagram showing a detailed circuit diagram of sample-and-hold circuits in the second aspect of the embodiment. Further, in FIG. 9, the constitution of a selector SEL is also shown. In a selector SEL, three switches SW1, 2, 3 are provided for selectively connecting the same column and the columns of both sides to a sample-and-hold circuit SH. Then, one of the switches can be closed by a control signal CSP, and one of the three columns is supplied to amplifier 30 of a sample-and-hold circuit SH. Further, a sample-and-hold circuit SH is the same as the circuit shown in FIG. 3, and a switches 42 are added to generate an average between adjacent columns. These switches 42 are controlled by control signal CSQ.

The method for selecting pixel signals in the second aspect of the embodiment will be explained by referring to FIG. 8 and FIG. 9. Row selecting circuit 12 sequentially selects rows of pixel array 10. When the first row is selected, the switch SW2 of the first column selector SEL conducts, so that the R pixel signal of the first column is held in the capacitor of sample-and-hold circuit SH1 of the first column, and the switch SW3 of the third column selector SEL conducts, so that the R pixel signal of the third column is held in the capacitor of sample-and-hold circuit SH2 of the second column. The operation is the same for the fifth column and the seventh column as well. The selectors SEL of the third, fourth, seventh and eighth columns are in the non-conductive state as-is. Thereafter, in response to a control signal CSQ, the averaging switch 42 between the first column and the second column, and the averaging switch 42 between the fifth column and the sixth column conduct, and the averages of two R pixel signals are held in the holding capacitors Csh of the first column and the fifth column, respectively.

Next, when the second row is selected, this time the switch SW3 of the second column selector SEL conducts, so that the G pixel signal of the first column is held in the capacitor of sample-and-hold circuit SH2 of the second column, and the switch SW2 of the third column selector SEL conducts, so that the G pixel signal of the third column is held in the capacitor of sample-and-hold circuit SH3 of the third column. The operation is the same for the selectors SEL of the sixth column and the seventh column as well. Thereafter, the switches 42 between the second and third columns, and between the sixth and seventh columns conduct, and the averages of two G pixel signals are held in the holding capacitors Csh of the third column and the seventh column, respectively.

Thereafter, column selecting circuit 14 drives odd-numbered column selection signals CS1, 3, 5, 7, and the pixel signals stored in sample-and-hold circuits SH1, 3, 5, 7 of the first, third, fifth and seventh columns are sequentially outputted to output line 16. Therefore, signals outputted to output line 16 are RGRG mosaic signals.

When the third row is selected, G pixel signals of the second, fourth, sixth and eighth columns are held in sample-and-hold circuits of the second and third columns, and sixth and seventh columns, and averaged G pixel signals are held in sample-and-hold circuits SH2, 6 of the second and sixth columns. Furthermore, when the fourth row is selected, B pixel signals of the second, fourth, sixth and eighth columns are held in sample-and-hold circuits of the third and fourth columns, and seventh and eighth columns, and averaged B pixel signals are held in sample-and-hold circuits SH4, 8 of the fourth and eighth columns. Thereafter, column selecting circuit 14 drives even-numbered column selection signals CS2, 4, 6, 8, and a GBGB mosaic signal is outputted to output line 16.

In the second aspect of the embodiment, even though the pixels are decreased to a quarter of all, pixel signals which have been decreased to a half are read out from the pixel array, and averaging of pixel signals of the same color, which are adjacent to one another in the row direction, is performed by sample-and-hold circuits SH. Furthermore, because two rows of pixel signals are combined and read to output line 16 from column gates CG, it is possible to output the same RGRG . . . GBGB . . . mosaic signals as an ordinary readout. Thus, an RGB simultaneous signal can be generated via the same processing as an ordinary readout.

Figure 10:
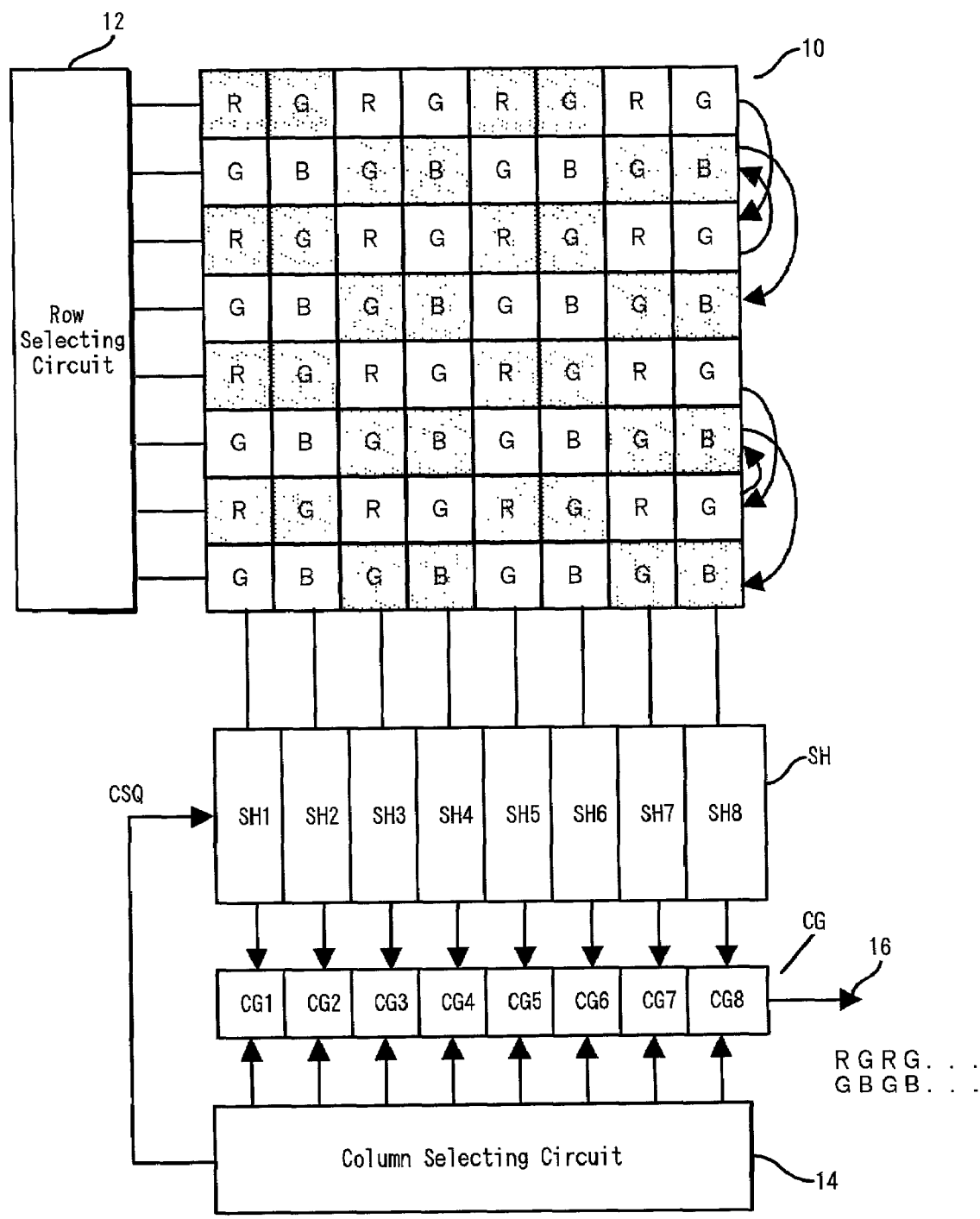
FIG. 10 is a diagram showing pixel selection in a third aspect of the embodiment.

FIG. 10 is a diagram showing pixel selection in a third aspect of the embodiment. In the third aspect of the embodiment, in order to decrease pixels to a quarter of all, pixels decreased to a half are read out from a pixel array 10, the averages of pixel signals of the same color, which are close to one another in the column direction, are taken, and one-fourth of the decreased pixel signals are ultimately outputted. Thus, in the image sensor of FIG. 10, the row selecting circuit 12 selects pixels of the pixel array in the order of the first row, third row, second row, and fourth row, as indicated by the arrows. And, as will be explained hereinbelow, holding capacitors are disposed in parallel inside the sample-and-hold circuits SH, and the averages of pixel signals of the same color, which are adjacent to one another in the column direction, are generated.

Figure 11:
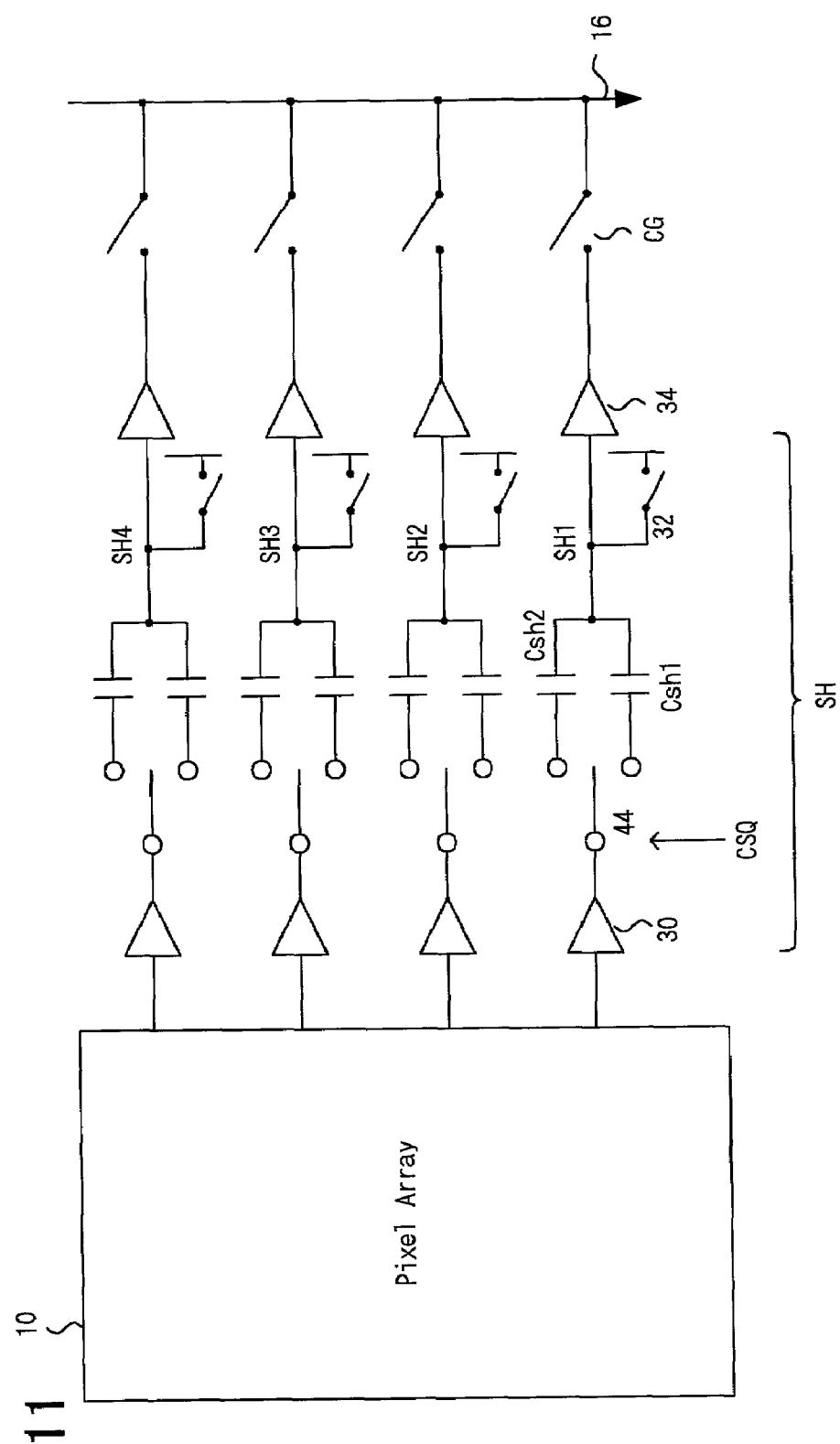
FIG. 11 is a detailed circuit diagram of sample-and-hold circuits SH in the third aspect of the embodiment.

FIG. 11 is a detailed circuit diagram of sample-and-hold circuits SH in the third aspect of the embodiment. As shown in the figure, two columns each of holding capacitors Csh are disposed in parallel in the sample-and-hold circuit of each column, and switch 44 of the stage prior thereto supplies pixel signals of the same color, which are adjacent to one another in the column direction, to holding capacitors Csh1, Csh2, respectively. Since these parallel holding capacitors Csh1, 2 are connected to electrodes of the opposite side, an average value of two pixel signals adjacent to one another in the column direction can be supplied to subsequent-stage amplifier 34.

The method of selecting pixels in the third aspect of the embodiment will be explained in accordance with FIGS. 10, 11. First, row selecting circuit 12 selects the pixel array of the first row, and one holding capacitor Csh1 of sample-and-hold circuits SH1, 2, 5, 6 of the first and second columns, and the fifth and sixth columns hold R pixel signals and G pixel signals, respectively. Next, row selecting circuit 12 selects the pixel array of the third row, and similarly, the other holding capacitors Csh2 of sample-and-hold circuits SH1, 2, 5, 6 of the first and second columns, and the fifth and sixth columns hold R pixel signals and G pixel signals, respectively. As a result of this, averaged R pixel signals and G pixel signals are held in these sample-and-hold circuits SH1, 2, 5, 6.

Thereafter, by column selecting circuit 14 sequentially driving column selection signals CS1, 2, 5, 6, RGRG mosaic signals which have been decreased to a quarter are outputted to output line 16.

Next, row selecting circuit 12 selects the pixel array of the second row, and one holding capacitors Csh1 of sample-and-hold circuits SH3, 4, 7, 8 of the third and fourth columns, and the seventh and eighth columns hold G pixel signals and B pixel signals, respectively. Next, row selecting circuit 12 selects the pixel array of the fourth row, and similarly, the other holding capacitors Csh2 of sample-and-hold circuits SH3, 4, 7, 8 of the third and fourth columns, and the seventh and eighth columns hold G pixel signals and B pixel signals, respectively. As a result of this, averaged G pixel signals and B pixel signals are held in these sample-and-hold circuits, and thereafter, these pixel signals GBGB . . . are outputted to output line 16 by column selecting circuit 14. This GBGB . . . pixel signal is the same as a mosaic signal.

In the third aspect of the embodiment, too, in order to decrease pixel signals to a quarter, pixel signals which have been decreased to a half are read out, and the averages of same color pixel signals adjacent to one another in the column direction are taken. And then, by making use of the hold function of the sample-and-hold circuits, RGB mosaic signals, which are the same as ordinary readouts, are outputted to output line 16. As a result of this, a subsequent-stage circuit for determining an RGB simultaneous signal can be the same circuit as at ordinary readout. And because pixel signals are read out after having been decreased to a half, the spatial resolution of the pixel signals can be improved.

Figure 12:
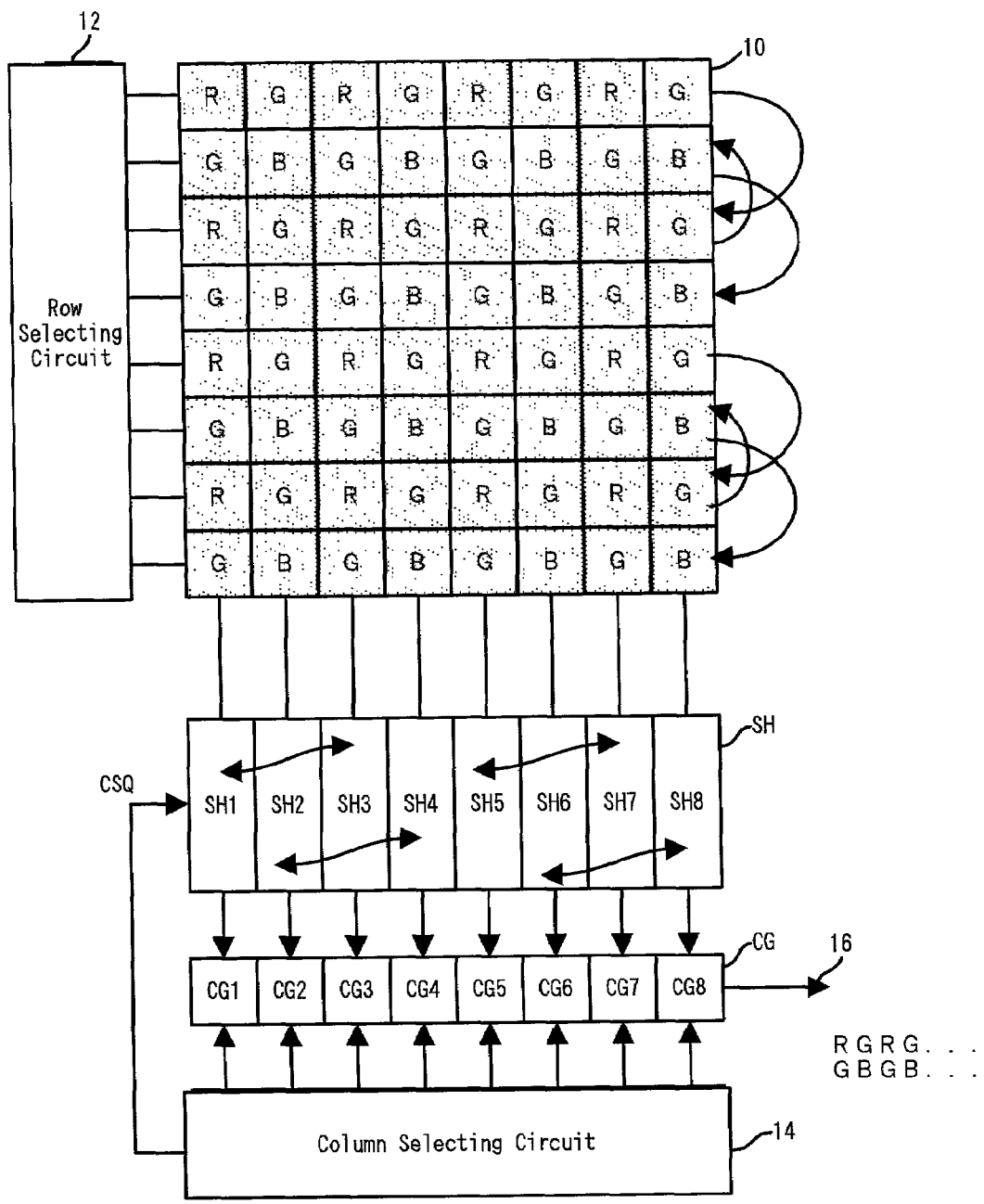
FIG. 12 is a block diagram of an image sensor of a fourth aspect of the embodiment.

FIG. 12 is a block diagram of an image sensor in a fourth aspect of the embodiment. In the fourth aspect of the embodiment, the averages of pixel signals of the same color, which are adjacent to one another in the column direction, are generated, and, in addition, the averages of pixel signals of the same color, which are adjacent to one another in the row direction, are also generated. In other words, the second aspect of the embodiment has been applied to the third aspect of the embodiment. As for the sample-and-hold circuits SH for this, as shown in FIG. 11, the sample-and-hold circuits of each column have parallel holding capacitors for holding pixel signals, which are adjacent to one another in the column direction, and, in addition, switches, which interconnect the capacitors of the first and third columns, second and fourth columns, fifth and seventh columns, and sixth and eighth columns, are provided for averaging pixel signals, which are adjacent to one another in the row direction. Control of the switches inside the sample-and-hold circuits is performed by control signals CSQ generated by column selecting circuit 14.

Figure 13:
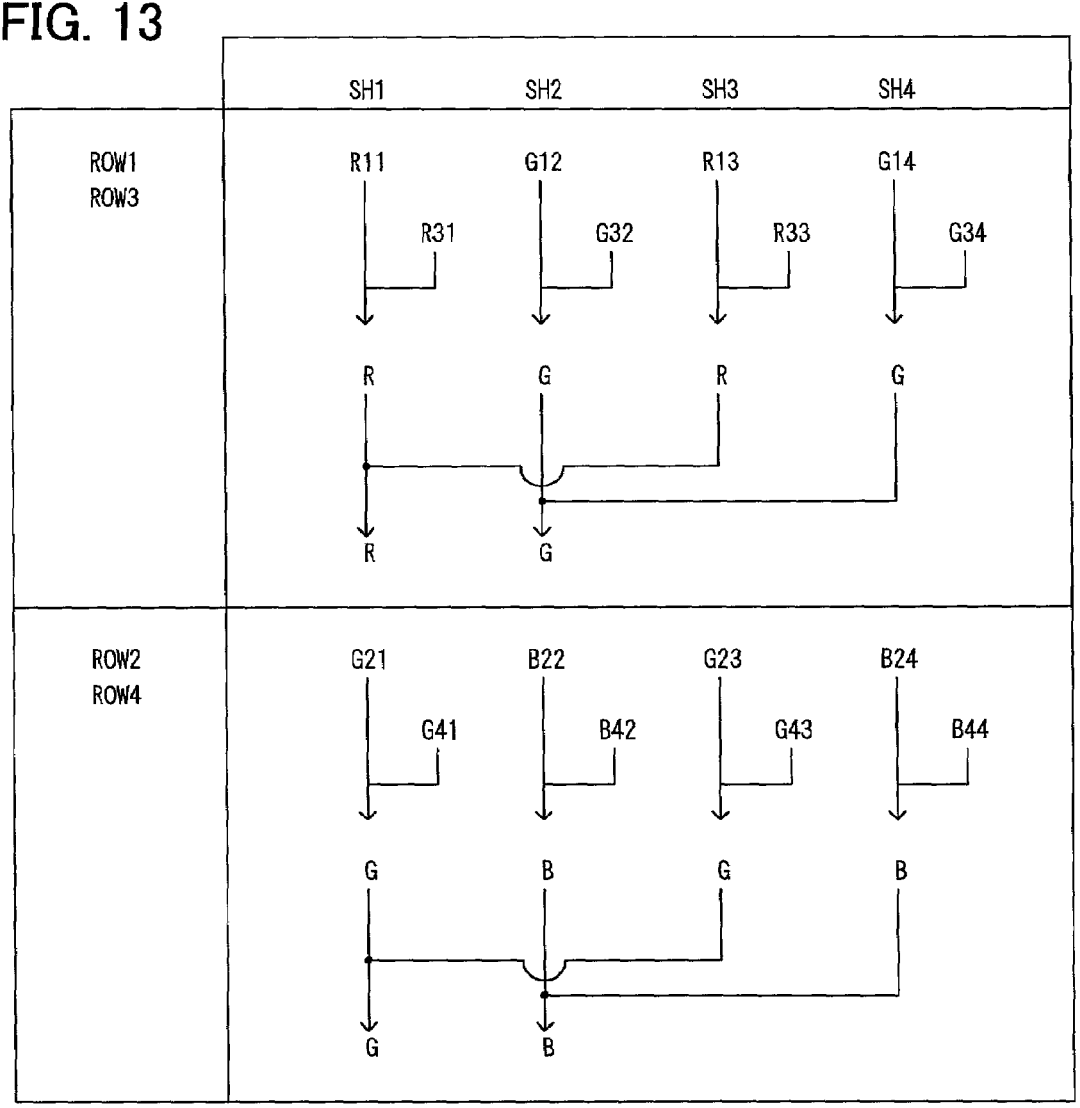
FIG. 13 is a diagram illustrating the operation of sample-and-hold circuits in the fourth aspect of the embodiment.

FIG. 13 is a diagram illustrating the operation of sample-and-hold circuits in the fourth aspect of the embodiment. In FIG. 13, the pixel signals held in each of the sample-and-hold circuits SH1, 2, 3, 4 of the first-fourth columns when a row ROW is selected, and the pixel signals to be averaged, are indicated by arrows.

Row selecting circuit 12 selects pixel arrays in the order of the first, third, second, fourth, fifth, seventh, sixth and eighth rows in the same manner as in the third aspect of the embodiment. First, the pixel array of the first row is selected, and pixel signals R1, G12, R13, G14 of the first-fourth columns are held in the one side holding capacitors of the respective sample-and-hold circuits SH1-SH4. Next, the pixel array of the third row is selected, and pixel signals R31, G32, R33, G34 of the first-fourth columns are held in the other side holding capacitors of the respective sample-and-hold circuits SH1-SH4. As a result of this, the averages of same-color pixel signals adjacent to one another in the column direction are generated in the same manner as in the third aspect of the embodiment. Thereafter, the switch between the first and third columns, and the switch between the second and fourth columns conduct, the average of the R pixel signals of the first column and third column is generated, and the average of the G pixel signals of the second column and fourth column is generated. As a result of this, after the pixel array of the third row has been selected, an RG mosaic signal is read out from output line 16. This mosaic signal has been decreased to a quarter, but because it is generated from all of the pixel signals, spatial resolution is higher.

Next, the pixel array of the second row is selected, and the pixel array of the fourth row is selected, and the average of same-color pixel signals adjacent to one another in the column direction, and the average of same-color pixel signals adjacent to one another in the row direction are generated. As a result of this, after the pixel array of the fourth row has been selected, a GB mosaic signal is read out from output line 16.

Similarly, after the pixel arrays of the fifth and seventh rows have been selected, an RG mosaic signal is outputted, and after the pixel arrays of the sixth and eighth rows have been selected, a GB mosaic signal is outputted, respectively.

In the fourth aspect of the embodiment, all the pixel signals are used, and a mosaic signal, which has been decreased to a quarter by an averaging process, can be outputted.

Figure 14:
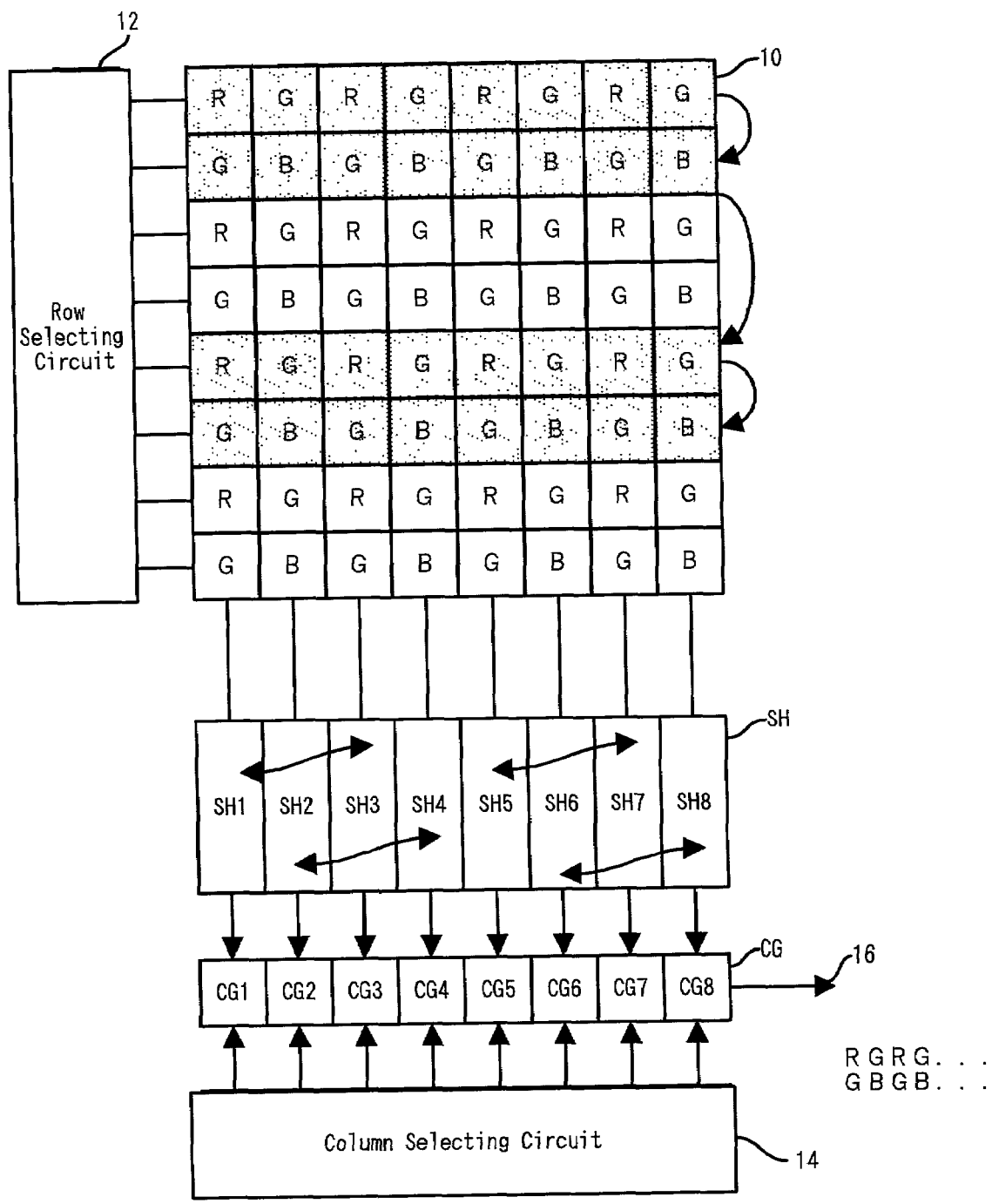
FIG. 14 is a block diagram of an image sensor in a fifth aspect of the embodiment.

FIG. 14 is a block diagram of an image sensor in a fifth aspect of the embodiment. In this aspect, row selecting circuit 12 sequentially selects the first and second rows, and the fifth and sixth rows, and after the respective rows have been selected, averaging between the first and third columns, averaging between the second and fourth columns, averaging between the fifth and seventh columns, and averaging between the sixth and eighth columns, respectively, are carried out in the sample-and-hold circuits SH as illustrated by the arrows in the figure. In other words, in the row direction, adjacent same-color pixel signals are averaged inside sample-and-hold circuits, and decreased to a half, and in the column direction, pixel signals are decreased to a half by row selecting circuit 12 selecting pixel arrays at intervals.

In the fifth aspect of the embodiment, each time a row is selected, same-color pixel signals, which are adjacent in the row direction, are averaged in sample-and-hold circuits, and outputted from output line 16. Consequently, when the first row is selected, an RGRG mosaic signal is outputted from output line 16, and when the second row is selected, a GBGB mosaic signal is outputted from output line 16. Furthermore, when the fifth row is selected, an RGRG mosaic signal is outputted, and when the sixth row is selected, a GBGB mosaic signal is outputted, respectively. In the fifth aspect of the embodiment, row selection is done at intervals, but all pixels in the column direction are selected.

Figure 15:
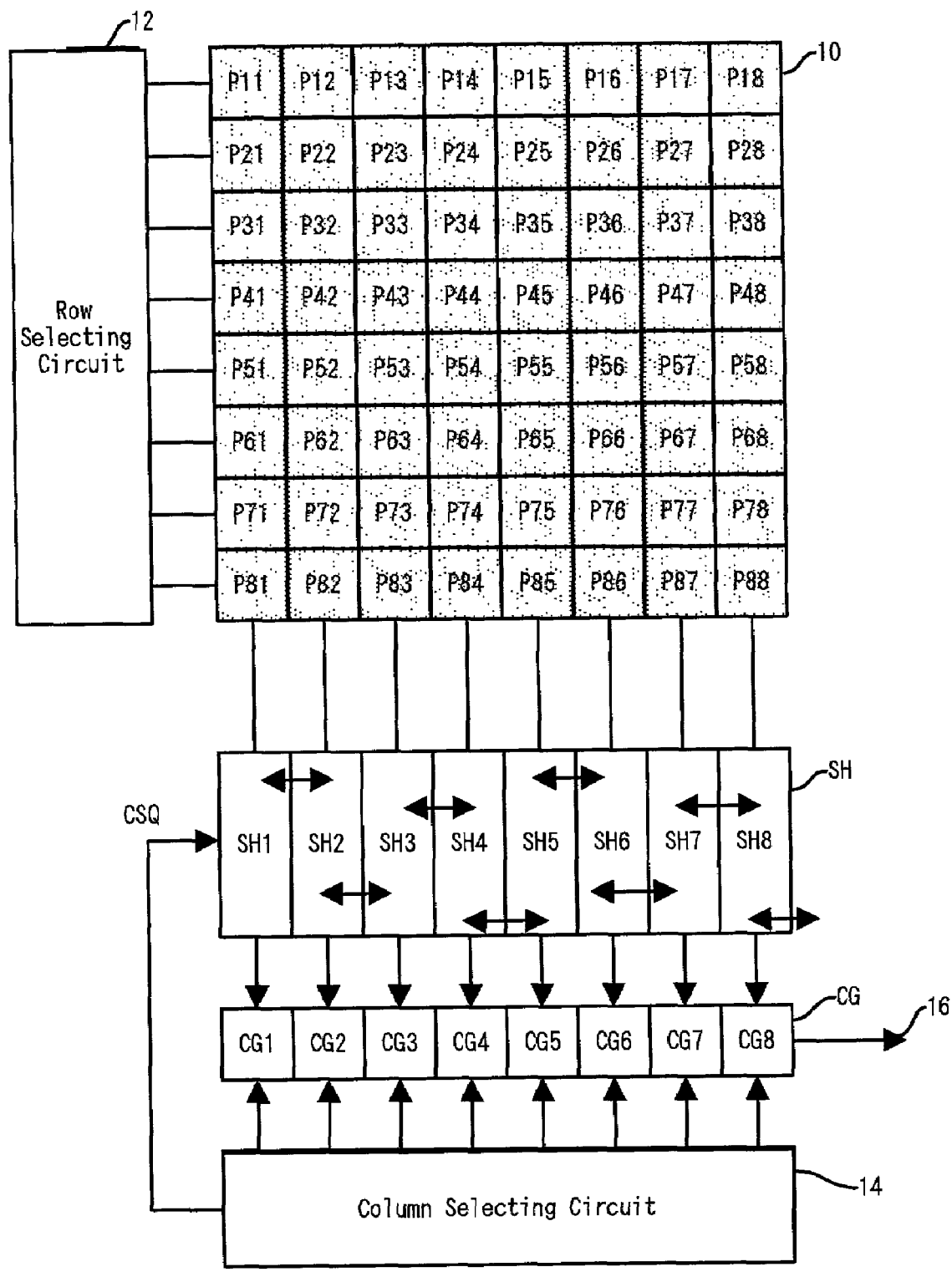
FIG. 15 is a block diagram of an image sensor in a sixth aspect of the embodiment.

FIG. 15 is a block diagram of an image sensor in a sixth aspect of the embodiment. In this aspect, black-and-white pixel signals are decreased to a quarter and read out. For a black-and-white image sensor, a color filter, which differs for each pixel, is not provided, and pixel signals corresponding to the black-and-white gray scale are generated in all pixels of pixel array 10.

In the sixth aspect of the embodiment, all pixel signals are read out, and according to circumstances, the average of pixel signals, which are adjacent in the row direction, is generated by sample-and-hold circuits SH, average values for two rows are held inside the respective sample-and-hold circuits SH, and after two rows of pixel array 10 have been read out, pixel signals held inside sample-and-hold circuits SH are outputted to output line 16 via column gates CG. Therefore, each time two rows are selected, pixel signal which have been decreased to a half is outputted from output line 16. As a result of this, a pixel signal which has been decreased to a quarter is outputted.

The constitution of a sample-and-hold circuit SH is the same as the example of FIG. 9, but control of the group of switches 42 for connecting capacitor electrodes between columns differs from that of the second aspect of the embodiment.

Figure 16:
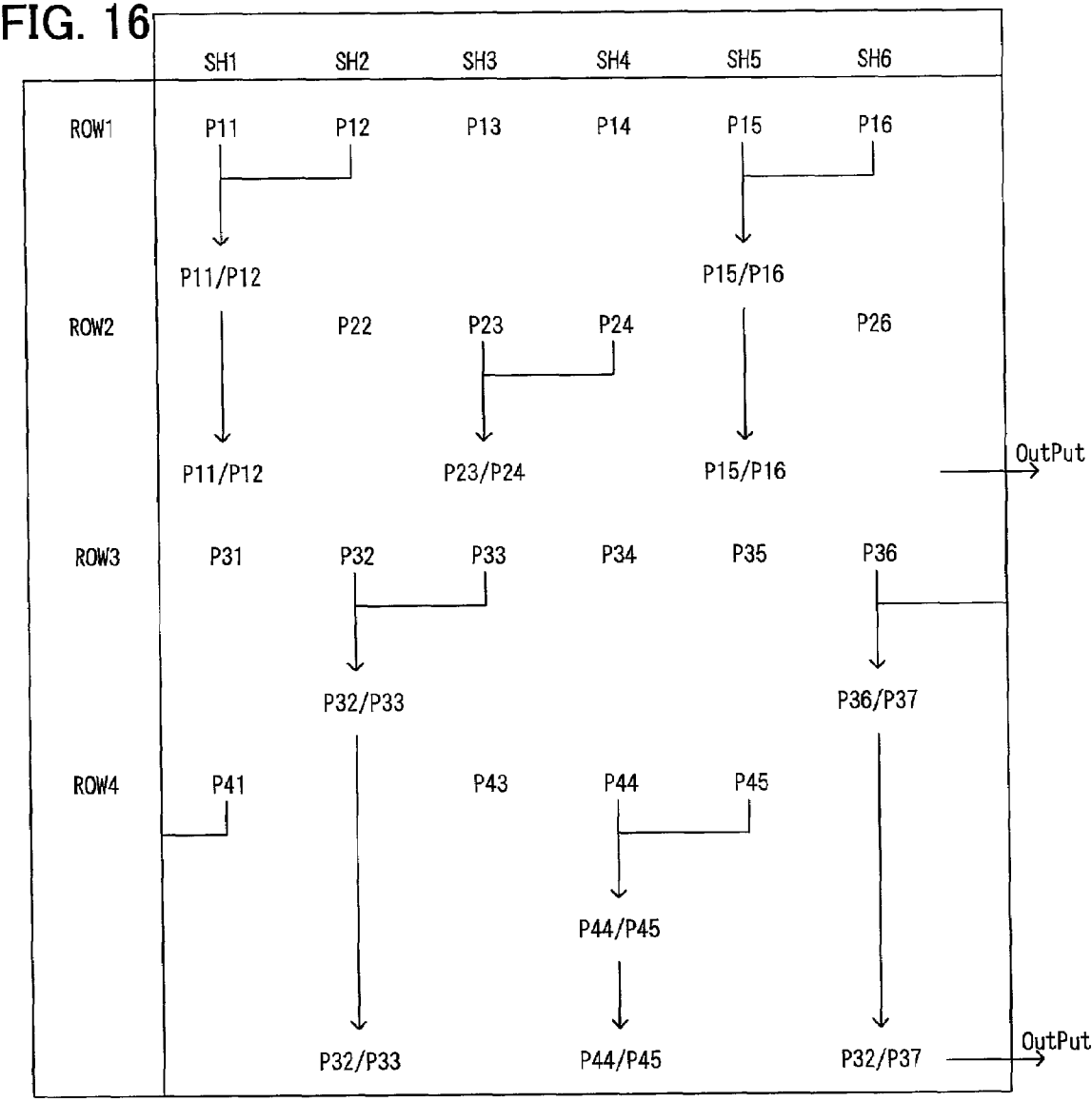
FIG. 16 is a diagram showing the operation of sample-and-hold circuits in the sixth aspect of the embodiment.

FIG. 16 is a diagram showing the operation of sample-and-hold circuits in the sixth aspect of the embodiment. When row selecting circuit 12 selects the first row of the pixel array, pixel signals P11, P12, P15, P16 of the first, second, fifth and sixth columns are held in sample-and-hold circuits SH1, SH2, SH5, SH6. Thereafter, switches 40 between the first and second columns, and fifth and sixth columns conduct, the averages of pixel signals held in these columns are generated, and are held by sample-and-hold circuits SH1, SH5 of the first column and the fifth column, respectively. Next, when the second row of pixel array is selected, pixel signals of the third and fourth columns are held in sample-and-hold circuits SH3, SH4. Thereafter, switches 40 between the third and fourth columns conduct, and the averages of pixel signals held in these columns are generated. In the meantime, sample-and-hold circuits SH1, SH5 of the first column and the fifth column hold pixel signals. Then, pixel signals held in odd-numbered column sample-and-hold circuits are outputted to output line 16 via column gates.

Similarly, when the third row of the pixel array is selected, pixel signals of the second and third columns, and the sixth and seventh columns are held in sample-and-hold circuits SH2, SH3, SH6, SH7, the switches 40 therebetween conduct, and the averages of the pixel signals held in these columns are generated. Then, these averages are held by sample-and-hold circuits SH2, SH6 of the second column and the sixth column. Similarly, the fourth row of the pixel array is selected, and the averages of pixel signals of the fourth and fifth columns are held in sample-and-hold circuit SH4 of the fourth column. Thereafter, pixel signals being held by sample-and-hold circuits of even-numbered columns are sequentially outputted.

In the sixth aspect of the embodiment, there are black-and-white pixel signals, all pixels are read out, the averages of pixel signals, which are adjacent to one another within the same row, are taken, and these averaged pixel signals are outputted from sample-and-hold circuits every two rows. As a result of this, it is possible to output decreased pixel signals, which have been decreased to a quarter and have high spatial resolution.

Figure 17:
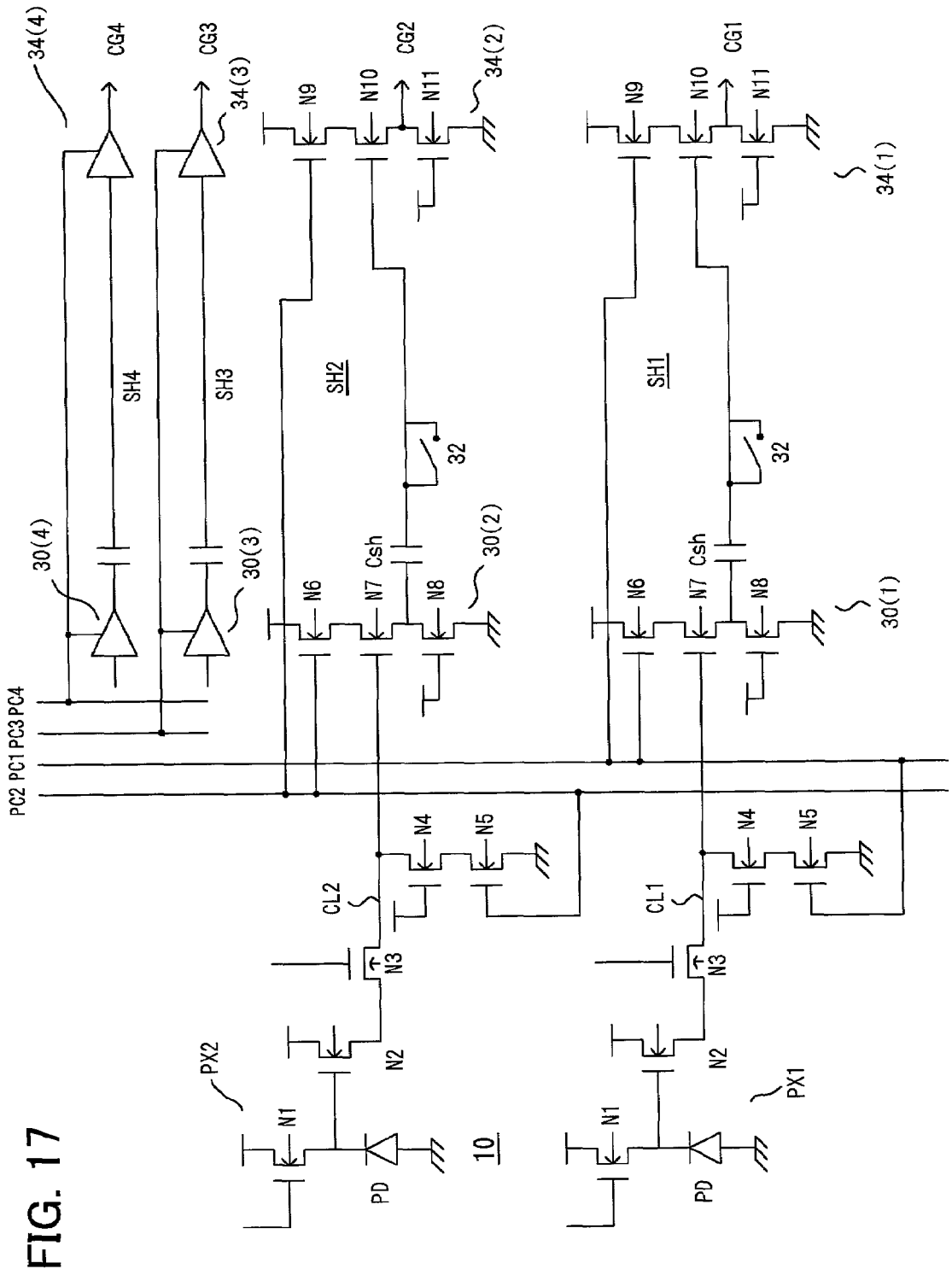
FIG. 17 is a circuit diagram indicating the reduced power dissipation of sample-and-hold circuits.

FIG. 17 is a circuit diagram showing the reduced power dissipation of sample-and-hold circuits. In FIG. 17, a column-direction pixel PX, a column line CL, and a sample-and-hold circuit SH are shown. For the sake of simplicity, two pixels PX1, 2, two column lines CL1, 2, two detailed sample-and-hold circuits SH1, SH2, and abridged sample-and-hold circuits SH3, SH4 are shown.

Pixels PX1, PX2 are the same as the example of FIG. 3. Further, a source of current transistor N4 and a switching transistor N5 for the source of current are provided in column lines CL1, CL2. Further, each sample-and-hold circuit SH1, 2 is constituted from a pre-stage amplifier 30 constituting a switching transistor N6 for activation, a transistor N7 for amplification, and a transistor N8 for a source of current, a post-stage amplifier 34 constituting a switching transistor N9 for activation, a transistor N10 for amplification, and a transistor N11 for a source of current, a capacitor Csh for holding, and a reset switch 32.

Now then, current source switching transistor N5, and activation switching transistors N6, N9 of amplifiers 30, 34 are connected to power control signals PC1-PC4 corresponding thereto. Power control signals PC1-PC4 are driven to H level for columns required for sampling and holding pixel signals. For example, when power control signal PC1 is driven to H level, current source switch N5 of the column line of the first column conducts, pre-stage amplifier 30(1) and post-stage amplifier 34(1) of sample-and-hold circuit SH1 are activated, and a pixel signal is sampled. In this case, reset switch 32 is also driven at a prescribed timing in accordance with power control signal PC1. Furthermore, when power control signal PC2 is driven to H level, the same switching transistor of the second column conducts, and activation occurs.

Accordingly, in the aspect of the embodiment described hereinabove, in a decreasing operation, a power control signal is controlled to L level as-is for a column for which operation is not required. As a result of this, power consumption can be reduced for that column. For example, in the first aspect of the embodiment of FIG. 4, when the pixel array of the first row is selected, since the sample-and-hold circuits of the first column and fifth column can be operated, only power control signal PC1 is driven to H level, and the remaining three power control signals PC2-PC4 constitute L level as-is.

Or, in the case of the third aspect of the embodiment of FIG. 10, when the first row of the pixel array is selected, since the sample-and-hold circuits of the first and second columns, and fifth and sixth columns should be operated, only power control signals PC1, PC2 are driven to H level, and the remaining two power control signals PC3, PC4 constitute L level as-is. Similarly, when the second row of the pixel array is selected, the power control signals are controlled to the reversed polarity of that described hereinabove.

Furthermore, in the case of the sixth aspect of the embodiment of FIG. 15, when the pixels of the first row are selected, power control signals PC1, PC2 are driven to H level for the first, second, fifth and sixth columns, and the power control signals PC3, PC4 for the third and fourth columns constitute L level as-is. Further, when the pixels of the third row are selected, power control signals PC2, PC3 are driven to H level for the second, third, sixth and seventh columns, and power control signals other than these are L level.

As explained hereinabove, a CMOS image sensor of the first aspect of the embodiment can prevent the degradation of spatial resolution in a decreased readout by using sample-and-hold circuits and column gates for amplifying and outputting pixel arrays and the pixel signals thereof. That is, by the operation of the row selecting circuit and the column selecting circuit, it is possible to spatially disperse pixel signals decreased and read out from a pixel array. When a pixel array is arranged in accordance with a Bayer Space (checkered pattern), it is possible to sequentially read out an RGB mosaic signal from spatially dispersed pixels.

Furthermore, in the second and subsequent aspects of the embodiment, the averages of pixel signals, which are either adjacent or close to one another, are determined and held until the optimal timing by sample-and-hold circuits, and sequentially read out from column gates, thereby enabling the output of an RGB mosaic signal, which has been decreased using more pixel signals. For example, when pixel signals are decreased to a quarter and read out, since pixel signals decreased from more numerous pixel signals are generated, the degradation of spatial resolution is prevented.

Furthermore, in the above aspects of the embodiment, the scanning directions of the row selecting circuit and column selecting circuit are horizontal direction from left to right, and vertical direction from top to bottom. However, even if the respective scanning directions are from right to left, and from bottom to top, it is possible to perform the same control as that of the aspects of the embodiment. Further, when the scanning direction is capable of being switched as needed, and it is possible to display a mirror-inverted image, the same control as that in the above aspects of the embodiment can be performed for the respective switched scanning directions.

Further, in the above aspects of the embodiment, explanations were given using examples in which RGB pixels were arrayed. However, the present invention is not limited thereto, and the same control can also be applied to an image sensor in which RGB, and CMY (cyan, magenta, yellow), which is a complementary color relationship, are arranged in a predetermined array. For example, the same decreasing mode readout can be performed even when odd-numbered rows make use of complementary color filters, by which pixels are arrayed in the order of MGMG, and even-numbered rows make use of complementary color filters, by which pixels are arrayed in the order of CYCY.

Furthermore, when RGB primary color filters are used, the present invention can also be applied when using an interlaced Bayer array, in which, two rows of RGRG and two rows of GBGB are each alternately arrayed.

According to the present invention explained hereinabove, an image sensor, which uses CMOS circuitry, is capable of suppressing the degradation of spatial resolution, and performing the decreased readout of pixel signals.

What is claimed is:

1. A color image sensor comprising:
a pixel array, in which pixels having photoelectric conversion circuits are arranged in rows and columns; and
a pixel selecting circuit having a row selecting circuit and a column selecting circuit;
wherein said pixel selecting circuit selects the pixels of all the rows and/or the pixels of all the columns, and selects a pixel signal at an interval of a plurality of pixels from among the selected pixel signals, and outputs the finally selected pixel signals,
the color image sensor further comprising:
a plurality of sample-and-hold circuits, provided at each column, for respectively sampling and holding pixel signals read out from said pixel array,
wherein said row selecting circuit selects each row in said pixel array in a predetermined order, and pixel signals of the selected rows are held in said sample-and-hold circuits, and said column selecting circuit selects and outputs, at intervals of a plurality of columns, pixel signals which are held in the plurality of sample-and-hold circuits,
wherein said pixel array is comprised of RGB pixels, said RGB pixels are arranged in a Bayer Space shape, and said sample-and-hold circuits, from among four adjacent rows, hold only R pixel signals from a first row, hold only G pixel signals from second and third rows, and hold only B pixel signals from a fourth row, and said column selecting circuit sequentially selects said held first and second row R, G pixel signals, and, furthermore, sequentially selects said held third and fourth row G, B pixel signals.

2. A color image sensor comprising:
a pixel array, in which pixels having photoelectric conversion circuits are arranged in rows and columns; and
a pixel selecting circuit having a row selecting circuit and a column selecting circuit;
wherein said pixel selecting circuit selects the pixels of all the rows and/or the pixels of all the columns, and selects a pixel signal at an interval of a plurality of pixels from among the selected pixel signals, and outputs the finally selected pixel signals,
the color image sensor further comprising:

sample-and-hold circuits, provided at each column, for respectively sampling and holding pixel signals read out from said pixel array; and a group of switches, disposed between said pixel array and sample-and-hold circuits, for suitably selecting said columns, and supplying the pixel signals to said sample-and-hold circuits, wherein said pixel array is comprised of RGB pixels, said RGB pixels are arranged in a Bayer Space shape, and, when a first row is selected from among four adjacent rows by said row selecting circuit, said sample-and-hold circuit holds the R pixel signals by way of a group of switches corresponding to the R pixel signals, and when a second row is selected, said sample-and-hold circuit holds the G pixel signals by way of a group of switches corresponding to the G pixel signals, and thereafter mosaic signals in the sequence of RGRG are sequentially selected and outputted by said column selecting circuit.

3. A color image sensor comprising:

a pixel array, in which pixels having photoelectric conversion circuits are arranged in rows and columns;

a row selecting circuit for selecting pixels in the row direction of said pixel array;

sample-and-hold circuits, provided at each column, for respectively sampling and holding pixel signals read out from said pixel array; and a column selecting circuit for selecting pixel signals which said sample-and-hold circuits hold, wherein said sample-and-hold circuits average pixel signals of the same color, which are close to one another in the row direction and/or column direction of said pixel array, wherein pixels of a plurality of color are arrayed in a predetermined order in said pixel array;

when said row selecting circuit sequentially selects pixels in a plurality of odd-numbered rows, said sample-and-hold circuits average same-color pixel signals in the column direction, and thereafter, the column selecting circuit sequentially selects the averaged pixel signals from said sample-and-hold circuits; and when said row selecting circuit sequentially selects pixels in a plurality of even-numbered rows, said sample-and-hold circuits average same-color pixel signals in the column direction, and thereafter, the column selecting circuit sequentially selects the averaged pixel signals from said sample-and-hold circuits;

whereby a first row mosaic signal having a first sequence of said plurality of colors, and a second row mosaic signal having a second sequence of said plurality of colors are outputted.

4. The color image sensor according to claim 3, wherein pixels of a plurality of colors are arrayed in a predetermined order in said pixel array;

when said row selecting circuit selects pixels in the row direction of said pixel array, said sample-and-hold circuits average pixel signals from the selected pixels, which are the same color, and are close to one another in the row direction; and said column selecting circuit sequentially selects and outputs said averaged pixel signals, which said sample-and-hold circuits hold.

5. The color image sensor according to claim 4, wherein said sample-and-hold circuits have holding capacitors for holding signals corresponding to pixel signals, and said averaged pixel signals are generated by connecting a plurality of holding capacitors in parallel.

6. The color image sensor according to claim 3, wherein pixels of a plurality of colors are arrayed in a predetermined order in said pixel array;

aid row selecting circuit sequentially selects pixels in a plurality of row directions having the same color arrangement inside said pixel array, and said sample-and-hold circuits, within the same column, average a first pixel signal when a first row direction pixel is selected, and a second pixel signal when a second row direction pixel is selected; and said column selecting circuit sequentially selects and outputs said averaged pixel signals, which said sample-and-hold circuits hold.

7. The color image sensor according to claim 6, wherein each of said sample-and-hold circuits has a plurality of holding capacitors in parallel for holding signals corresponding to pixel signals, and signals corresponding to said first pixel signal and second pixel signal, respectively, are sequentially held in different holding capacitors, so that said averaged pixel signals are generated.

8. The color image sensor according to claim 3, wherein said pixel array has pixels of a plurality of colors which are arrayed in a predetermined order;

said sample-and-hold circuits hold pixel signals, which are in a plurality of row directions and in different columns; and said column selecting circuit selects and outputs pixel signals, which said sample-and-hold circuits hold, as a first row mosaic signal having a first sequence of said plurality of colors, and a second row mosaic signal having a second sequence of said plurality of colors, respectively.

9. The image sensor according to claim 3, wherein a scanning direction of said row selecting circuit and/or said column selecting circuit is reversible.

* * * * *